US011346585B2

(12) United States Patent
Bahar et al.

(10) Patent No.: US 11,346,585 B2
(45) Date of Patent: May 31, 2022

(54) ADVANCED METAL HYDRIDE HEAT TRANSFER SYSTEM UTILIZING AN ELECTROCHEMICAL HYDROGEN COMPRESSOR

(71) Applicant: Xergy Inc., Georgetown, DE (US)

(72) Inventors: Bamdad Bahar, Georgetown, DE (US); William Parmelee, Seaford, DE (US)

( * ) Notice: Subject to any disclaimer, the term of this patent is extended or adjusted under 35 U.S.C. 154(b) by 0 days.

(21) Appl. No.: 15/403,299

(22) Filed: Jan. 11, 2017

(65) Prior Publication Data

US 2017/0198947 A1     Jul. 13, 2017

Related U.S. Application Data

(60) Provisional application No. 62/326,532, filed on Apr. 22, 2016, provisional application No. 62/324,337, filed on Apr. 18, 2016, provisional application No. 62/315,664, filed on Mar. 30, 2016, provisional application No. 62/308,060, filed on Mar. 14, 2016, provisional application No. 62/303,300, filed on Mar. 3, 2016, provisional application No. 62/300,082, filed on Feb. 26, 2016, provisional application No.
(Continued)

(51) Int. Cl.
| | |
|---|---|
| *F25B 17/12* | (2006.01) |
| *F25B 25/02* | (2006.01) |
| *F17C 11/00* | (2006.01) |
| *F25B 35/04* | (2006.01) |

(52) U.S. Cl.
CPC ............ *F25B 17/12* (2013.01); *F17C 11/005* (2013.01); *F25B 25/02* (2013.01); *F25B 35/04* (2013.01); *F25B 2500/18* (2013.01); *Y02A 30/27* (2018.01); *Y02B 30/62* (2013.01); *Y02E 60/32* (2013.01)

(58) Field of Classification Search
CPC ......... F25B 17/12; F25B 35/04; F17C 11/005
See application file for complete search history.

(56) References Cited

U.S. PATENT DOCUMENTS

| | | | | |
|---|---|---|---|---|
| 6,492,044 | B1 * | 12/2002 | Walsh | ............... H01M 8/04171 429/457 |
| 2004/0119194 | A1 * | 6/2004 | Aladjov | ............. B29C 47/0004 264/176.1 |

(Continued)

OTHER PUBLICATIONS

Tao et al.; Electrochemical Compressor Driven Metal Hydride Heat Pump; Aug. 28, 2015, Elsevier, Internalal Journal of Refrigeration 60 (2015) 278-288.*

*Primary Examiner* — Emmanuel E Duke

(57) ABSTRACT

An electrochemical heat transfer device utilizes an electrochemical hydrogen compressor to pump hydrogen into and out of a reservoir having a metal hydride forming alloy therein. The absorption of hydrogen by the metal hydride forming alloy is exothermic, produces heat, and the desorption of the hydrogen from the metal hydride forming alloy is endothermic and draws heat in. An electrochemical hydrogen compressor may be configured between to reservoirs and pump hydrogen back and forth to form a heat transfer device. A heat exchange device may be coupled with the reservoir or may comprise the outer surface of the reservoir to transfer heat to an object or to the surroundings. A closed loop may be configured having two reservoirs and one or two electrochemical hydrogen compressors to pump the hydrogen in a loop around the system.

15 Claims, 17 Drawing Sheets

Related U.S. Application Data

62/297,123, filed on Feb. 18, 2016, provisional application No. 62/292,529, filed on Feb. 8, 2016, provisional application No. 62/288,417, filed on Jan. 28, 2016, provisional application No. 62/277,399, filed on Jan. 11, 2016.

(56) References Cited

U.S. PATENT DOCUMENTS

| | | | |
|---|---|---|---|
| 2004/0142215 A1* | 7/2004 | Barbir | H01M 8/04089 429/411 |
| 2006/0188774 A1* | 8/2006 | Niu | H01M 4/8605 429/409 |
| 2008/0286621 A1* | 11/2008 | Rosenzweig | A61K 31/655 429/421 |
| 2010/0132386 A1* | 6/2010 | Bahar | F25B 1/00 62/115 |
| 2013/0039779 A1* | 2/2013 | Bahar | F04B 19/20 417/48 |
| 2015/0241091 A1* | 8/2015 | Bahar | F04B 19/20 62/115 |
| 2016/0024666 A1* | 1/2016 | Bahar | C25B 9/70 205/338 |

\* cited by examiner

ADVANCED METAL HYDRIDE HEAT TRANSFER SYSTEM UTILIZING AN ELECTROCHEMICAL HYDROGEN COMPRESSOR

CROSS REFERENCE TO RELATED APPLICATIONS

This application claims the benefit of priority to U.S. provisional patent application No. 62/277,399 filed on Jan. 11, 2016, U.S. provisional patent application No. 62/288,417 filed on Jan. 28, 2016; U.S. provisional patent application no. 62/292,529, filed on Feb. 8, 2016, U.S. provisional patent application no. 62/297,123 filed on Feb. 18, 2016, U.S. provisional patent application No. 62/300,082, filed on Feb. 26, 2016, U.S. provisional patent application No. 62/303,300 filed on Mar. 3, 2016, U.S. provisional patent application No. 62/308,060 filed on Mar. 14, 2016, U.S. provisional patent application no. 62/315,664 filed on Mar. 30, 2016, U.S. provisional patent application no. 62/324,337 filed on Apr. 18, 2016, and U.S. provisional patent application no. 62/326,532 filed on Apr. 22, 2016; the entirety of each provisional listed above is herein incorporated by reference herein.

STATEMENT OF GOVERNMENT LICENSE RIGHTS

This invention was made with government support under Department of Energy grant DE-EE0007040, and Department of Energy grant DE-SC0009636. The government has certain rights in the invention

BACKGROUND OF THE INVENTION

Field of the Invention

The present invention relates to electrochemical compressor-driven metal hydride heating/cooling elements and their use.

Background

The function of heat pumps is to remove heat from a heat source or reservoir at low temperature and to reject the heat to a heat sink or reservoir at high temperature. While many thermodynamic effects have been exploited in the development of heat pumps and refrigeration cycles, one of the most popular today is the vapor compression approach. This approach is sometimes called mechanical, refrigeration because a mechanical compressor is used in the cycle. Any improvement in efficiency related to compressor performance can have significant benefits in terms of energy savings and thus have significant positive environmental impact.

Vapor compression heat pump cycles generally contain five important components. The first is a mechanical compressor that is used to pressurize a gaseous working fluid. After proceeding through the compressor, the hot pressurized working fluid is condensed in a condenser. The latent heat of vaporization of the working fluid is given up to a high temperature reservoir, often called the sink. The liquefied working fluid is then expanded at substantially constant enthalpy in a thermal expansion valve or orifice. The cooled liquid working fluid is then passed through an evaporator. In the evaporator, the working fluid absorbs its latent heat of vaporization from a low temperature reservoir often called a source. The last element in the vapor compression refrigeration cycle is the working fluid itself.

In conventional vapor compression cycles, the working fluid selection is based on the properties of the fluid and the temperatures of the heat source and sink. The factors in the selection include the specific heat of the working fluid, its latent heat of vaporization, its specific volume, and its safety. The selection of the working fluid affects the coefficient of performance of the cycle. In an electrochemical compressor, the electrochemical characteristics of a potential working fluid is important. Fluids can be selected for active or passive participation in the compression system. An active material is driven through the compressor in a reversible redox reaction whereas passive working fluids are moved through the compressor by association with the electroactive species, in most cases $H_2$.

For a refrigeration cycle operating between a lower limit, or source temperature, and an upper limit, or sink temperature, the maximum efficiency of the cycle is limited to the Carnot efficiency. The efficiency of a refrigeration cycle is generally defined by its coefficient of performance, which is the quotient of the heat absorbed from the sink divided by the net work input required by the cycle.

Any improvement in heat pump systems clearly would have substantial value. Electrochemical energy conversion is considered to be inherently better than other systems due to their relatively high, exergetic efficiency. In addition, electrochemical systems are considered to be noiseless, modular, and scalable and can provide a long list of other benefits depending on the specific thermal transfer application.

Dry sorption systems based on metal hydrides to provide heating and cooling, metal hydride heating and cooling systems (MHHCS), are known. The coefficient of performance of most single stage MHHCS systems have been below 0.5 through the 1990's. A decade or so later, coefficient of performance as high as 1.5 has been reported. Most recently, coefficient of performance above 2.5 or better has been shown, which can be better than conventional vapor compression systems. A major challenge in the development or application of the MHHCS units has been the development and availability of low capacity, dry, hydrogen compressors that can operate efficiently.

A traditional problem with mating electrochemical compressors to metal MHHCS units has been the need to provide dry hydrogen to the metal hydride units. Metal Hydrides are very sensitive to hydrolysis and any amount of moisture in the hydrogen gas accelerates the aging of these compounds. In addition, the materials used for storing the hydrides are generally made from, low alloy steels that are sensitive to aqueous corrosion as well as to hydrogen embrittlement, and the interactions between these two types of damage caused by the presence of moisture is a significant concern.

Electrochemical systems typically require water for proton mobility and therefore provide a humidified hydrogen stream to the electrochemical compressor. Coupling an electrochemical compressor with a drying operation adds complexity and parasitic energy to the system, and increases both the overall cost of the system and operational costs.

Metal hydride heat pumps as well as electrochemical compressors are known devices with unique features and benefits. However, mating the two units for proper operation for appliances is non-trivial. There are numerous, sometimes subtle, often non obvious elements that must be incorporated into systems to enable long-term, safe operation of an electrochemical compressor driven metal hydride heat pump.

Therefore, there is a need for a low-cost system and method to operate a metal hydride heat pump at low humidity levels.

SUMMARY OF THE INVENTION

The present invention is directed to an electrochemical compressor-driven metal hydride heat pump system. In an exemplary embodiment, the metal hydride heat pump utilizes a dry hydrogen gas without excessive parasitic loads, such as from a condenser. One advantage of these systems is the elimination of Freon and other refrigerants that are a major environmental concern. Another advantage is the noiseless, and vibration free operation of the systems. Finally, without the parasitic load of desiccation systems for the hydrogen gas, the systems provide very high efficiencies, high coefficients of performance, for many important applications.

The heat pump system utilizes the highly exothermic absorption of hydrogen gas into a hydride-forming metal alloy or intermetallic compound. Metal hydride (MH) formation is highly reversible, and the endothermic desorption of hydrogen from the metal hydride matrix requires a heat supply approximately equal to the heat released during hydrogen absorption. Both of these processes are represented by the reaction.

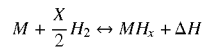

$$M + \frac{X}{2}H_2 \leftrightarrow MH_x + \Delta H$$

where M represents the hydride-forming metal of choice.

In an exemplary embodiment, the device or system of the present invention comprises at least one electrochemical compressor (ECC) to transfer pressurized hydrogen between two packed beds of metal hydride material as shown schematically in FIGS. 1 & 2. The heat and cold released by the metal hydride bed during the adsorption/desorption process will be extracted by a working fluid circulating through a heat exchanger to transfer heat between the exothermic metal hydride reactor. Coupling an electrochemical compressor with metal hydride packed bed reactors summarily represents a solid-state heating technology with no moving parts and without the thermodynamic irreversibility associated with conventional vapor compression cycles, thereby enabling operational efficiencies beyond Carnot cycle limitations. The only irreversibility associated with the electrochemical compressor and metal hydride packed bed system arises from the entropy produced in their respective undergirding electrochemical (hydrogen oxidation/reduction) and chemical (hydrogen absorption/desorption) reactions, thus allowing gains in efficiency that are unachievable with purely mechanical heating cycles.

An exemplary electrochemical heat transfer system of the present invention comprises an electrochemical heat transfer device comprising, an electrochemical hydrogen compressor that moves a working fluid, such as hydrogen to and from at least one metal hydride reservoir. The electrochemical hydrogen compressor is set to a potential to decompose hydrogen into protons that pass through a proton conducting layer from an anode side to a cathode side of the electrochemical hydrogen compressor. The protons reform into hydrogen on the cathode side. The working fluid comprising hydrogen may be pumped by the electrochemical hydrogen compressor to a single metal hydride reservoir from a separate containment vessel, such as a desiccant unit, comprising a desiccant, and then back to from the reservoir to the desiccant unit. In another embodiment, an exemplary electrochemical heat transfer system comprises a first and a second metal hydride reservoir and one or more electrochemical compressors pumps working fluid from the first to the second metal hydride reservoir. In a preferred embodiment, a single electrochemical compressor is used to pump working fluid comprising hydrogen from the first to the second metal hydride reservoir. A plurality of conduits and valves may be configured to enable the electrochemical compressor to pump the working fluid in one direction through the electrochemical compressor. The plurality of conduits may form a closed loop with the first and second reservoirs configured in the closed loop. The electrochemical hydrogen compressor may be configured with an outlet in an outlet portion of the closed loop and an inlet on art inlet portion of the closed loop. Valves configured in the plurality of conduits between the outlet and inlet of the electrochemical compressor and the two reservoirs enables one way pumping of hydrogen through the electrochemical compressor and back and forth between from the first and second reservoirs. This is a unique configuration that optimizes the system.

A heat transfer device is coupled with the metal hydride reservoirs to transfer heat from the metal hydride reservoir to an object directly, such as being in thermal contact with the object, conduction, or indirectly by convection, wherein a fluid is heated by the metal hydride reservoir and passed to a secondary object. A heat transfer device is in thermal communication with the metal hydride reservoir when it conducts thermal energy to or from the metal hydride reservoir through conduction or convection. An exemplary heat transfer device may comprise conduits that are in thermal communication with the metal hydride reservoir and may be in contact with the metal hydride reservoir, or pass into the metal hydride reservoir and be in direct contact with the metal hydride. A metal hydride reservoir may be a tube and a heat exchange conduit may be configured along the inner conduit of the tube. An exemplary heat exchange conduit may pass around a metal hydride reservoir in a spiral configuration as well. An exemplary heat transfer device may comprise thermal conductor elements that are in contact with the metal hydride reservoir and extend out to increase convective heat transfer, such as fins. An, exemplary heat transfer device may comprise a portion of the metal hydride reservoir, wherein the metal hydride reservoir is thermally conductive and transfers heat directly through contact with an object or comprises extensions, fins, that increase convective heat transfer to a heat transfer fluid that passes over the extensions.

The system of the present invention overcomes limitations inherent to previous compressor-driven metal hydride heat pumps concepts that engaged per-fluorinated sulfonic acid (PFSA) proton exchange membrane (PEM) design requiring alternating desiccation/rehydration of the Hydrogen stream and flow circuit design The electrochemical compressor operates through electrocatalytic oxidation of hydrogen at the anode side of a proton exchange membrane at low pressure, reduction of protons on the cathode side of the membrane to yield hydrogen at high pressure. PFSA membranes must remain well hydrated in order to maintain proton conductivity, and are also restricted to operating temperatures to below 80° C. Consequently, the hydrated, hydrogen stream exiting the compressor must be desiccated (inherently non-continuous; and parasitic) since water vapor will denature the metal hydride bed by transforming it to a metal hydroxide.

In an exemplary embodiment, the electrochemical compressor polytetrafluoroethylene (PBI/PTFE) composite membrane which has demonstrated markedly improved thermal and mechanical stability over conventional perfluorinated sulfonic acid PEM at higher temperatures (100-200° C.) while maintaining acceptable proton conductivity. The use of ultra-thin, composite membranes for use in electrochemical devices, such as electrochemical compressors, is taught in pending U.S. Pat. No. 9,457,324, to Behar, and entitled, Active Components And Membranes For Electrochemical Compression; the entirety of which is hereby incorporated by reference. Composite membranes having a thickness of 25 μm or less, including 20, 15 and even 10 μm or less are disclosed. These thin composite membranes may comprise polybenzimidazole (PBI) which does not require hydration of the membrane as does PFSA membrane. PBI membranes are typically functionalized with phosphoric acid to provide proton mobility. The imidazole rings are capable of functioning as a proton donor or proton acceptor. PBI membranes are also broadly chemical resistant and have high strength and structural stability. Since the (PBI/PTFE) composite membrane derives its proton conductivity from functionalization with phosphoric acid, the membrane is able to operate in a "dry state", eliminating the need for desiccation of the high pressure hydrogen gas upstream of the metal hydride reactor. In an exemplary embodiment, the metal hydride heat pump comprises an electrochemical compressor that incorporates a composite PSI membrane that has, a thickness of 25 μm or less, including 20, 15 and even 10 μm or less, and any range between and including the thickness values provided.

In another embodiment a second class of membranes based on a combination of pyridine and polysulfone for electrochemical applications is utilized in the electrochemical compressor. Sold under the TPS brand by Advent Technologies, these pyridines and polysulfone materials are provided as a extruded film. In an exemplary embodiment, the pyridine and polysulfone materials are made into composite membranes, such as by casting them on or into ultra-thin, strong, porous reinforcing material, such as ePTFE membrane, sold under the Gore-Tex brand by W. L. Gore and Associates, Newark, Del. A composite membrane, as described herein, may be thin, strong, and high performance and capable of being functionalized with Phosphoric acid. A composite membrane may comprise an integral reinforcing membrane, such as ePTFE membrane, or may comprise reinforcing discrete elements, such as fibers that are disposed on, or into the ionomer material, i.e. PFSA, PBI or the combination of pyridine and polysulfone.

Membranes comprising polybenzimidazole or combinations of pyridine and polysulfone exhibit higher ionic resistivity than traditional ion exchange membranes of similar thickness, however, in thin composite form, the films can be made almost an order of magnitude thinner and therefore provide low overall resistance. The graphs provided in FIGS. 4 and 5 show some of the properties of the TPS films, again a combination of pyridine and polysulfone. But most importantly, the films do not generally need water for proton conduction, and as a result can tolerate dry hydrogen input and provide dry hydrogen output suitable for metal hydride storage. The membranes can be further modified to include tertiary components such as silica or zeolites that can further entrain moisture or any other contaminants and ensure cleaner output of compressed gas.

It is important to recognize that metal hydride need specific pressures to absorb hydrogen, and other specific pressures, generally lower than the absorption pressures to desorb the hydrogen. The ratio of the absorption to desorption pressure Higher efficiencies are gained when the pressure ratio of the pressure of the output gas to the pressure of the incoming gas is minimized. In one embodiment, the pressure ratio of the electrochemical compressor is as high as 20 or more, or about 30 or more, 35 or more and any range between and including the pressure ratios provided. However, lower ratios are better, and more efficient, wherein they require less power. Some metal hydrides such as those in Tables 1 to 4. LaNi4.8Al02 are reported to have P(low) of 2.47 atmospheres and a P(high) of 35.84 atmospheres, a pressure ratio requirement of 14.51; another hydride Mm Ni(4.7) Fe(0.3) has a P(L) of 1.29 atmospheres and a P(H) of 12.14 i.e. a ratio of 9.41.

TABLE 1

| COMPOSITION | A | B | COMPOUNDS |
|---|---|---|---|
| $A_2B$ | Mg, Zr | Ni, Fe, Co | $Mg_2Ni$, $Mg_2Co$, $Zr_2Fe$ |
| AB | Ti, Zr | Ni, Fe | TiNi, TiFe, ZrNi |
| $AB_2$ | Zr, Ti, Y, La | V, Cr, Mn, Fe, Ni | $LaNi_2$, $YNi_2$, $YMn_2$, $ZrCr_2$, $ZrMn_2$, $ZrV_2$, $TiMn_2$ |
| $AB_3$ | La, Y, Mg | Ni, Co | $LaCo_3$, $YNi_3$, $LaMg_2Ni_9$ |
| $AB_5$ | Ca, La, Rare Earth | Ni, Cu, Co, Pt, Fe | $CaNi_5$, $LaNi_5$, $CeNi_5$, $LaCu_5$, $LaPt_5$, $LaFe_5$ |

TABLE 2

| Hydride | ΔH, cal/mol | ΔS, cal/mol-K | $\overline{m}_c$, g/mole |
|---|---|---|---|
| $V_{0.92}Cr_{0.83}$ | −8930 | −33.3 | 109.8 |
| $V_{0.925}Cr_{0.075}$ | −8680 | −33.4 | 128.3 |
| $V_{0.9}Cr_{9.1}$ | −7970 | −32.0 | 120.9 |
| NiZr | −7270 | −17.1 | 112.0 |
| $V_{0.83}Cr_{0.19}$ | −7100 | −30.0 | 347.3 |
| $MNi_{4.5}Al_{0.46}Fe_{0.05}$ | −7420 | −26.5 | 290.0 |
| $LaNi_5$ | −7380 | −25.8 | 175.8 |
| $Fe_{0.85}Mn_{0.15}Ti$ | −7040 | −25.6 | 220.0 |
| $PrNi_5$ | −6940 | −28.5 | 220.0 |
| $MNi_{4.5}Al_{0.05}$ | −6700 | −25.2 | 281.2 |
| FeTi | −6700 | −25.3 | 242.4 |
| $NdNi_5$ | −6650 | −27.8 | 167.8 |
| $MNi_{4.15}FE_{0.13}$ | −6000 | −25.0 | 308.4 |
| $Zr(Fe_{0.75}Cr_{0.25})_2$ | −5920 | −21.9 | 206.2 |
| $Ca_{0.7}M_{0.3}Ni_5$ | −6400 | −24.0 | 168.8 |
| $Ca_{0.5}M_{0.6}Ni_5$ | −6160 | −24.8 | 168.8 |
| $Ca_{0.4}M_{0.6}Ni_5$ | −6040 | −25.2 | 168.8 |
| $Ca_{0.2}M_{0.8}Ni_5$ | −5800 | −26.0 | 168.8 |
| $Ce_{0.5}La_{0.5}Ni_{2.5}Cu_{2.5}$ | −5500 | −20.7 | 393.0 |
| $CeNi_5$ | −5300 | −26.7 | 198.5 |
| $CeNi_{4.5}Al_{0.3}$ | −5230 | −22.0 | 220.1 |
| $MNi_5$ | −5000 | −23.1 | 203.1 |
| $ZrMn_2Cu_{0.5}$ | −6170 | −13.8 | 175.0 |
| $ZrMn_{2.3}$ | −4710 | −14.7 | 200.0 |
| $ZrMn_{2.3}$ | −4400 | −12.5 | 200.0 |
| $Zr_{0.8}Ti_{0.2}MnFe$ | −2660 | −9.4 | 175.0 |

TABLE 3

| Alloys used | Type | Mass (kg) | Capacity (KW) | COP |
|---|---|---|---|---|
| $LaNi_5/MmNi_{4.15}Fe_{0.85}$ | R | 3.6 | 0.6 | — |
| $LaNi_{4.3}Al_{0.3}/MmNi_{4.15}Fe_{0.83}/$ | R | 3.6 | 0.6 | — |
| $LaNi_{4.7}Al_{0.3}/LaNi_{4.05}Al_{0.15}$ | R | 90 | — | 0.42 |
| $LaNi_{4.65}Al_{0.35}/MmNi_4Fe$ | R | 40 | 1.75 | — |
| $LaNi_{4.65}Al_{0.35}/MmNi_4Fe$ | R | 40 | 1.3 | 0.3 |
| $LaNi_{4.7}Al_{0.3}/MmNi_{4.15}Fe_{0.85}$ | R | 90 | 22.8 | — |
| $LaNi_5/LaNi_{4.7}Al_{0.3}$ | HP | 20 | 0.6 | — |
| $LaNi_{4.7}Al_{0.3}/MmNi_{4.65}Fe_{0.35}$ | HP | 1.0 | — | — |
| MmNiMnAl/MmNiMnCo | HP | 64 | 3.0 | — |

TABLE 3-continued

| Alloys used | Type | Mass (kg) | Capacity (KW) | COP |
|---|---|---|---|---|
| $MmNi_{4.4}Mn_{0.5}Al_{0.05}Co_{0.05}$ $MmNi_{4.7}Mn_{0.15}Lm_{0.95}Ni_5$ | R | 48 | 4.6 | — |
| $LaNi_{4.5}Al_{0.5}/(CFM)Ni_5$ | R | 2.6 | — | 0.33 |
| $Zr_{0.9}Ti_{0.1}Cr_{0.9}Fe_{1.1}/$ $Zr_{0.9}Ti_{0.1}Cr_{0.6}Fe_{1.4}$ | R | 4.5 | 0.683 | — |
| $ZrMnFe/MmNi_{4.5}Al_{0.5}$ | R | 1.5 | 0.1 | 0.2-0.4 |
| $LaNi_{4.7}Al_{1.3}/MmNi_{4.15}Fe_{0.85}$ | R | — | — | — |
| $LaNi_{4.5}Al_{0.4}/MmNi_{4.55}Fe_{0.15}$ | HP | 3.0 | 0.15-0.2 | 17-0.2 |
| $LaNi_5$ | C | 1 | 1.5 (150 s cooling) | — |
| $Ca_{0.4}Mm_{0.6}Ni_5$ | C | 1 | 2.2 (150 s cooling) | — |
| $LaNi_{4.6}Al_{0.4}$ $MmNi_{4.15}Fe_{0.85}$ | R | 3 | 0.15 | — |
| $Zr_{0.9}Ti_{0.1}Cr_{0.55}Fe_{1.45}$ | C | 1 | 0.41 | 1.8 |

TABLE 4

| alloy | ΔH | ΔS | $c_L$ | $c_H$ | $d(\ln P_d)/dc$ | $\ln(P_a/P_d)$ | M |
|---|---|---|---|---|---|---|---|
| $LaNi_5$ | 30.8 | 0.108 | 0.07 | 1 | 0.13 | 0.13 | 432.456 |
| $MmNi_{4.15}Fe_{0.85}$ | 25.3 | 0.105 | 0.1 | 0.75 | 0.36 | 0.17 | 431.373 |
| V | 40.1 | 0.1407 | 1 | 2 | 0.15 | 0.45 | 50.942 |
| $(V_{0.9}Ti_{0.1})_{0.95}Fe_{0.05}$ | 43.2 | 0.1396 | 1 | 1.95 | 0.45 | 0.8 | 50.898 |
| $CaNi_5$ | 31.9 | 0.101 | 0.2 | 0.75 | 0.19 | 0.16 | 333.63 |
| $LaNi_{4.7}Al_{0.3}$ | 34 | 0.1068 | 0.03 | 0.8 | 0.48 | 0.05 | 422.938 |
| $LaNi_{4.8}Sn_{0.2}$ | 32.8 | 0.105 | 0.03 | 0.95 | 0.22 | 0.19 | 444.452 |
| $TiFe_{0.8}Ni_{0.2}$ | 41.2 | 0.119 | 0.1 | 0.5 | 0.36 | 0.05 | 104.32 |

It is important to understand, that the metal hydride heating system, or heat pump described herein is not only interested in low pressure ratio metal hydrides for highest efficiency, but also materials that have heat/cool enthalpies. i.e. Kj/mol H2 absorbed or desorbed, and high hydrogen, absorption, low density (weight), and also high recycling capacity.

For most appliance applications, literally thousands, perhaps as many as millions of cycles are required. Novel and specific operating strategies that maximize metal hydride cycle life, are provided. Where the metal, hydride is not stretched to is physical limits, not to its lowest desorption pressure and highest desorption pressure or pressure ratios less than their reported absolute limits, such as 90% or 80% or even 50% of their pressure limits, the life of the metal hydride may be extended. By keeping pressure ratios below their maximum limits, the metal hydride is not expanded or contracted to its full extent and may have extended life. In other words, the absorption and desorption remains in the linear portion of the "vant huff" plots for the specific compound as shown in FIG. 14.

Another strategy for extending life of the metal hydride is keeping it dry. Hydrogen gas is fed in the driest state possible. A desiccant system may be employed that is used to keep the hydrogen gas dry. The hydrogen gas may flow through or be stored in a desiccant unit periodically A desiccant system may be coupled with one or both sides of an electrochemical hydrogen compressor and the hydrogen may flow into or through the desiccant unit during a cycle. A bypass valve may be used when desiccation is not required, as determine by a moisture, or humidity sensor. A side loop or stream that can be opened and shut periodically could be established with a desiccation system put in place to effectively ensure the cleanliness of the hydrogen gas.

Another strategy for extending life of the metal hydride is incorporating additives to the metal hydride such as fluoropolymer powder or silica, for example, to enable hydrogen gas to access metal hydride media, but to also allow for expansion and contraction without the hydride powder bumping into each other and damaging adjacent, particles. Fluoropolymer particles or powder added to the metal hydride may prevent metal hydride particles from fusing together and may maintain a high surface area of hydriding.

The form and material sets of a metal hydride reservoir may have an impact on life. Metal hydride powder could be packaged in a reservoir that is flexible. For example, the metal hydride may be packaged in tubes, such as expanded PTFE (ePTFE) tubes, and may be connected to a central mandrill and contained in a uniform and consistent manner to allow for gas access, but also stable containment without excessive movement and bumping into other particles. Rigid tubes would not provide this expansion/contraction as would a flexible wall of a reservoir. Porous tubes, such as ePTFE tubes, also provide good hydrogen access to and from the metal hydride. The metal hydride medium may be segregated inside narrow tubes, so that not only the material is separated from creating a large fused block but to also provide very high surface area for heat exchange as well as a short distance to the metal hydride material itself to improve heat exchange efficiency.

Another approach would be to put the metal hydride medium inside a small canister that may have open ports, or inside an expanded PTFE (ePTFE) tube, such as either in a continuous line, or in small packets and then place these packets inside a larger cylinder for hydriding and safe storage and handling. Expanded PTFE tubes can be purchased from companies, such as W. L. Gore & Associates or Phillips Scientific. Any suitable permeable tubing that can withstand the chemical and temperature requirements of the metal hydride heat exchanger may be used. One benefit of the ePTFE systems is that they can withstand thermal activity, not only when the system absorbs hydrogen, but also, when the metal hydride is initially preheated and prepared for the hydriding system. Alternatively, plastic straws made of thermally conductive plastic, such as those made by Celanese, may be used to house the metal hydride material rather than a porous medium, or a metal tube, and then these straws can be connected to a header for hydriding purposes. These tubes could be plugged with stainless steel frit or porous plastic to ensure that the metal hydride remains in the tube, while hydrogen can access it.

Metal Hydride housings may also be made using various layers of conductive materials such as aluminum and thermal plastics, etc. to avoid any hydrogen escape directly through the material in question In the most traditional of metal hydride heat pump systems (MHHCS), a compressor sits between two metal hydride reservoirs that are sequentially filled and emptied with hydrogen. An electrochemical compressor's polarity can be reversed, or multiple compressors, can be used for this. While this is obviously feasible, alternative configurations are feasible, with say two different metal hydride compounds in different reservoirs, or where the output from one hydride reservoir enters the input of the other reservoir, i.e. the P(L) of one reservoir s that P(H) of the other reservoir. This is termed a regenerative unit.

The benefit of a regenerative unit is that now the electrochemical compressor only needs to pump in one direction from the P(L) of the low receiving reservoir to the P(H) of the other reservoir. By not reversing the polarity of the electrochemical compressor, membrane and electrode life are maximized, and system reliability is retained. In an exemplary embodiment, the metal hydride heating system describe herein is a regenerative system, and may function in a mode wherein the polarity of the electrochemical compressor is not reversed, which may provide a better, more durable system.

In this context, one option for creating a high compression ratio from an electrochemical compressor, is to put multiple cells in series. In a normal compressor configuration, the cells are plumbed in parallel, but powered in series. But where higher compression ratios are required for specific metal hydrides or hydride reservoir configurations, membrane electrode assemblies can be combined, such as being plumbed in series initially in short trains, and then in parallel as usual. One benefit of short membrane electrode assembly trains is the exponential increase in pressure feasible. One important benefit of this system, is that individual membrane electrode assemblies can be operated at lower discrete voltages, closer to their Nernst potential, and then combined so that the compressor as a whole can be operated at the bus voltages required by electronics system employed for the specific appliance where the metal hydride heating and cooling systems is required.

In an exemplary embodiment, a first hydride portion or reservoir comprises a metal hydride that has a desorption pressure that is higher than an absorption pressure of a second metal hydride contained within a second metal portion. The first and second metal hydride portions may be configured in series in a loop closed loop configuration of a metal hydride heat transfer system, or in parallel. In one embodiment, a first and second metal hydride portion, having different metal hydrides therein, are configured on the same side of an electrochemical compressor and in another embodiment, they are configured on opposing sides of an electrochemical compressor.

It is also important to recognize that the low pressure entering the compressor can be sub-ambient or at least low enough that the hydrogen gas may have problems being transported to the surface of the electrode(s). Therefore a back ported and side ported cell technology may be utilized to allow operation at low pressure feeds. These systems allow the membrane electrode assemblies to breathe having a large inlet area and low pressure drop for fuel gas into the electrochemical cell. An exemplary metal hydride heating system, as described herein, may operate at low pressures, utilizing low pressure absorption/desorption metal hydrides and breathing designed electrochemical cells for use with metal hydride systems. Note that traditional compressors in the past have been variants of automotive fuel cell designs with inlet ports place within bipolar plates. not side ported (at 90 degrees to the cells), but in the direction as the cell assembly plane.

One other novel improvement to metal hydride heating and cooling systems with electrochemical compressors provided herein, is the use of another side stream of input hydrogen from a small electrolyzer or generator, in connection with water, where hydrogen is produced, put through the desiccant column and then added to the metal hydride heating and cooling systems to make up for any hydrogen that may be depleted over time as it irreversibly complexes with metal hydride compounds. Alternatively, a small side cylinder of hydrogen can be provided for this purpose.

The invention is directed to an electrochemical compressor driven metal hydride heat pump system. In one embodiment, an electrochemical compressor, as described herein, comprises an electrochemical cell and a working fluid consisting of hydrogen. The electrochemical cell is capable of producing high-pressure gas consisting of an electrochemically-active component, such as hydrogen.

A heating or cooling device, as described herein, comprises an electrochemical hydrogen compressor or hydrogen compressors coupled to at least one reservoir, and preferably two, containing metal hydride-forming alloy, that may systemically be configured in thermal communication with an object to be heated. The metal hydride-forming alloy may be in a packed bed. An exemplary heating device comprises an electrochemical compressor configured to control the pressure of hydrogen gas, passing between at least two metal hydride reservoirs. The absorption of hydrogen gas into suitable metal alloy leads to the exothermic formation of a metal hydride producing useful heat as shown in FIG. 1 The endothermic desorption of hydrogen gas is reversible, requiring about as much heat as that released by absorption, which thereby produces useful cooling, as shown in FIG. 2

In an exemplary embodiment, a working fluid comprises or preferably consists essentially of pure, dry hydrogen. In an exemplary embodiment, the working fluid comprises at least 90% hydrogen, or at least 95% hydrogen, or at least 99% hydrogen. A working fluid consists essentially of hydrogen when the working fluid is at least 95% hydrogen, or preferably at least 99% hydrogen. The electrochemical compressor comprises a membrane electrode assembly that comprises an anode, a cathode, and a cation exchange membrane located between the anode and cathode.

In an exemplary embodiment, the cation exchange membrane comprises a phosphoric acid-functionalized polybenzimidazole/polytetrafluoroethylene (PBI/PTFE) composite membrane, however any cation exchange material may be used that can operate at low humidity and high temperatures, such as 100-200° C., with high mechanical durability. The composite membrane may also include an additive such as silica to further assist in dry hydrogen compression. Additives may also reinforce the membrane, and may prevent compression of the membrane. The anode and cathode comprise a catalyst suitable for running the reactions as described herein. At the anode, hydrogen is oxidized into protons and electrons. The protons are then transferred across the cation exchange membrane to the cathode, where the hydrogen is produced through a reduction reaction. A power supply may be coupled to the anode and cathode to drive the reactions and transfer the hydrogen working fluid across the membrane electrode assembly at constant volume, thereby pressurizing the hydrogen. A working fluid inlet is coupled with the anode, or anode side of the electrochemical compressor and a working fluid outlet is coupled with the cathode, or cathode side of the electrochemical compressor. An electrochemical compressor-driven metal hydride heating element further comprises at least two reservoirs of metal hydride-forming material, between which the compressor passes the hydrogen. Heat transfer elements thermally coupled to the reservoirs, including but not limited to heat exchange coils circulating a suitable heat transfer medium, can be used in conjunction with a circulator pump to transfer useful heat produced away from whichever metal, hydride reservoir is exothermically absorbing hydrogen at the moment. The invention can be alternately used as a cooling, unit by modifying the heat exchange loop to transfer useful cooling from a metal hydride reservoir undergoing endothermic desorption.

The high pressure side of the compressor stream could be used to drive a turbine, to help in pumping heat transfer liquid that is in communication with a heat exchanger.

Note this system could be applied to a wide variety of applications already disclosed such as hot water heaters, but also to very cool, cryogenic, type applications depending on the hydride selected.

While the example provides for two hydride beds in communication with a single compressor, one could potentially use two compressors as opposed to one, so you minimize valving and the compressor(s) can be operated at pressures above the low pressure and below the high pressure points of the hydride (to minimize hydride stresses and extend hydride life). Could be say 80% of the range.

In fact, it is preferable to use metal hydrides where the ratio of high pressure to low is minimized (i.e. more efficient system). And one hydride reservoir and a second non-hydride storage bottle(s) saving on expensive hydride supply.

It is possible to use air for cooling, and the liquid loop for heating purposes in thermal communication with the hydride bed.

For the purposes of this disclosure, the tubular elements that contain metal hydrides are referred to as heat exchangers.

A heat exchanger is a device used to transfer heat between one or more fluids. The fluids may be separated by a solid wall to prevent mixing or they may be in direct contact. It is important to recognize that heat exchangers can be classified in many different ways. For the purposes of this disclosure, heat exchangers are characterized into recuperative and regenerative types. Most appliances use recuperative type heat exchangers. A regenerative heat exchanger, or more commonly a regenerator, is a type of heat exchanger where heat from the hot fluid is intermittently stored in a thermal storage medium before it is transferred to the cold fluid. To accomplish this, the hot, fluid is brought into contact with the heat storage medium, then the fluid is displaced with the cold fluid, which absorbs the heat. A metal hydride container may be considered a regenerative heat exchangers, as further described herein. For example, a secondary working fluid may be used to exchange heat with the metal hydride heat exchanger for delivery to another thermal reservoir as needed in the appliance in question. A secondary working fluid, or heat exchange fluid, may be any suitable fluid including, but not limited to, water, ethylene glycol, or simply air or a gas, as needed.

In an exemplary embodiment, there is a primary loop of an electrochemical compressor driving a working fluid such as hydrogen into a metal hydride coupled with a heat exchanger, and eventually, directly or indirectly, receiving the same fluid back to the electrochemical compressor, and a secondary loop of a secondary working fluid, or heat exchange fluid, that actually exchanges heat with the metal hydride heat exchanger and carries the heat from the heat exchanger to a secondary location, such as appliance.

In an exemplary embodiment, an electrochemical compressor and metal hydride heat exchanger or pump are configured in a hybrid hot water system. The heat pump may utilize ethylene glycol as the heat exchange fluid and the ethylene glycol may be pumped through or around a metal hydride heat exchanger and then into a hot water heater, where it is in thermal communication with water within the reservoir to heat the water within the reservoir. A coil of tubing that transports the ethylene glycol may be configured in the bottom of the hot water reservoir for heating the water therein, for example. The ethylene glycol travels in a loop and releases its heat to the water, and may optionally also exchange heat also using classical air coil(s) with the environment.

Metal hydride beds, or heat exchangers may comprise of many different types of hydrides and formulations. Depending on the appliance involved, the metal hydride formulation may be optimized for different temperature and/or pressure regimes for the specific application. For example, for heating a system based on LaNi(4.8)Al(0.2) may be employed and, for cryogenic cooling, a system may employ TiCr(1.9). It is not uncommon in regenerative systems for metal hydride materials in different reservoirs to, be made of different alloys, and the output from one unit be used as the input for another one. Also, it is entirely feasible that a secondary loop, or heat exchange loop, for one reservoir hydride heat exchanger may be different to the secondary loop for a second reservoir, wherein one is air cooled and another water cooled, for example.

Virtually all metal hydrides are sensitive to contamination with water, therefore it is critical to ensure that the impact of water be minimized. One way to do this is to use a classical desiccant, water removal, system in line between the compressor and the metal hydride heat exchanger, as described herein. However, desiccant may also be added as a topping layer to the metal hydride system, or even blended in with the metal hydride to preferentially absorb the water. One known desiccant medium is silica, but there are countless other materials well known the art. Desiccant media may also contain catalytic materials such as palladium or platinum that can accelerate water absorption or conversion of any contaminants in the hydrogen stream.

Heat exchange conduits may be in thermal communication with the heat exchanger and a fluid, such as water or ethylene glycol, may circulate through the conduits. The conduits may be configured with baffles or other heat exchange features to ensure high thermal transfer; and operation with minimal sensible heat loss. Once the heat exchangers are established, clearly operating the hydrogen compressor, and configuration of the plumbing lines is vital for overall successful operation.

Depending on what membrane is used, the electrochemical compressor may need to be preheated before start-up and some areas of the lines may need to be preheated too. Obviously, stacks can contain a heating plate to help with start-up and temperature maintenance. This might be especially important on a cold day.

One benefit of a metal hydride heat pump is that the heat generated or removed is cycled, and the rate of cycling determines the total wattage of heating or cooling available. Thus, appliance operators can set different cycling rates for different points in an appliances operation to ensure most efficient operation. Also, electrochemical compressors can be operated at different operating points. For example, in a hot water heater, the system can be cycled frequently if there is a sudden high volume demand for hot water, or cycled slowly if the system is simply trying to maintain the reservoir at a given temperature without any water demand.

Examples of novel plumbing configurations are provided herein. Note that in these examples, the compressor is always operating in the same direction. However, compressors can also operate with polarity being reversed instead of using valves to control the direction of flow. There are advantages to operating the electrochemical compressor in one direction, including life and general ease of operation.

In an exemplary embodiment, electrochemical compressors can be provided with integrated secondary loop for heat exchange with the metal hydride. For example, plumbing of a secondary loop may be configured pass through at least a portion of the bipolar plates. In addition, the bipolar plates may be designed to have integrated metal hydride beds to absorb or desorb hydrogen and produce and receive heat. This integrated system reduces the potential for losses of hydrogen from connections and valves, concentrates the heat exchanger around the compressor and reduces complexity. An integrated metal hydride heat exchanger may not require any valves. The whole unit can be made smaller and integrated into one hermetically sealed unit that performs all the key functions required for heat exchange.

Exemplary bipolar plates of an integrated metal hydride heat exchanger can be made of two stamped metal plates, and laser welded on the seams. A secondary fluid or heat exchanger fluid can be ported in and out of the bipolar plates. The system can be filled with Hydrogen gas through external porting and then simply supplemented with hydrogen when an if necessary. An integrated metal hydride heat exchanger may be designed to be fully hermetically sealed or configured inside a hermetically sealed enclosure. An exemplary metal hydride heat exchanger may comprise a plurality of electrochemical compressor units in series. Hydrogen may be pumped one direction to produce heat and then reversed to draw heat from the heat exchange loop that is integrated into the system.

Metal Hydrides used within these configurations can be tailored for specific end uses, however, as an illustration, for heating water La Ni4.7 Sn0.3 maybe employed with a low temperature portion (TL) of 25° C., and a high temperature portion (TH) of 80° C.; and a lower pressure limit, (PL) of 0.31 Atmosphere, and a higher pressure limit (PH) of 3.03 Atmosphere. This is a compression ratio of ten times for maximum thermal exchange. As an illustration, for cooling applications such as HVAC, or Freezers, TiCr or VTi combinations such as Ti0.9Zr0.2CrMn may be employed with TL-20 C, TH 50 PL3.95, PH49.69. This is a compression ratio of more than ten times for maximum thermal exchange.

Also, to improve thermal exchange, the metal hydride beds could be made very thin, and designed for high surface area availability in wave like patterns, or pressed into plates that already have good thermal exchange designs configured on their surfaces. Those skilled in the art, understand this method, and variations of this art are well established that can increase absorption rates and improve thermal transfer.

In order to minimize thermal bleed, it may be useful to separate metal hydride chambers being cycled as far as possible from each other. In the illustration above, the hydride beds are placed at opposite ends of the stack, or within the bipolar plate. However, plumbing could be adjusted to place the hydride chambers on each side of the stack, through the length of the stack. If the compressor cells are made long and thin, as is useful for maximizing current density under low anode pressure conditions or for aesthetic properties, then the metal hydride chambers can be placed along the side of the stack to create an essentially long and narrow system. This may have utility in certain installations. In an exemplary embodiment, the electrochemical cell stacks are designed with cells that are longer in one dimension than another, therefore bring long and narrow, and the placement of flat hydride systems adjacent to the stack so that the whole device is essentially long and narrow, or flat.

Exemplary electrochemical heat transfer systems have been tested in our labs for a number of appliance applications, such as for example hybrid hot water heaters. The metal hydride units get hot very quickly, and as a result do not suffer from the limitations of current heat pumps used in hot water systems that heat up slowly, and require the use of additional heating capacity in the form of resistance heaters. Electrochemical compressor driven metal hydride heat exchangers can eliminate the resistance heaters in hot water systems. Also, because the electrochemical compressor units run more efficiently at partial load, they can be modulated to operate in a more efficient mode by intelligent use and signaling. This may be particularly useful when hot water systems are used for thermal storage for utility load management demand responsiveness. Units can be controlled remotely, and be integrated into communication protocols common with 'smart homes' and 'smart grids'. Exemplary electrochemical heat transfer systems may be integrated with a smart home or couple with a smart grid.

Depending on the membrane employed in the electrochemical compressor, and the metal hydride, heat exchange system engaged, it may be necessary to strategically place heaters within the system to pre-heat surfaces and enable operation, ion exchange in high temperature membranes, or hydrogen release from metal hydride systems.

Separately, it has been well established that the Nernst Equation can be a source of power generation when there is a pressure difference across an ion exchange medium. Hydrogen pressure can be generated by heating the metal hydride with bound Hydrogen and power generated by essentially running the unit in reverse. This may be, a useful feature of this technology, and useable in emergency situations. This may also be connected to the smart home or smart grid management systems The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

FIGS. 12 and 13 show schematics of a hydride portion wherein FIG. 12 is a side view and FIG. 12 is a cross-section along line 13-13 of FIG. 12.

DETAILED DESCRIPTION OF THE ILLUSTRATED EMBODIMENTS

Figure 1:
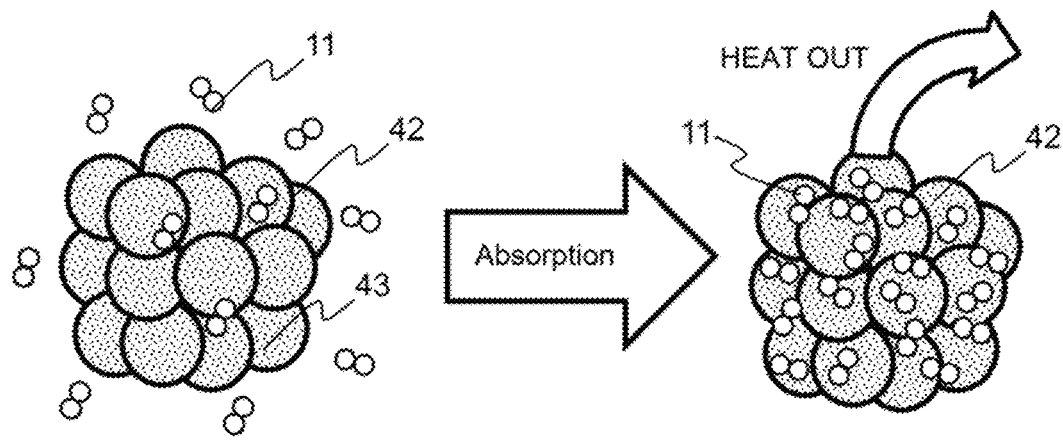
FIG. 1 shows metal hydride during absorption.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other venation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
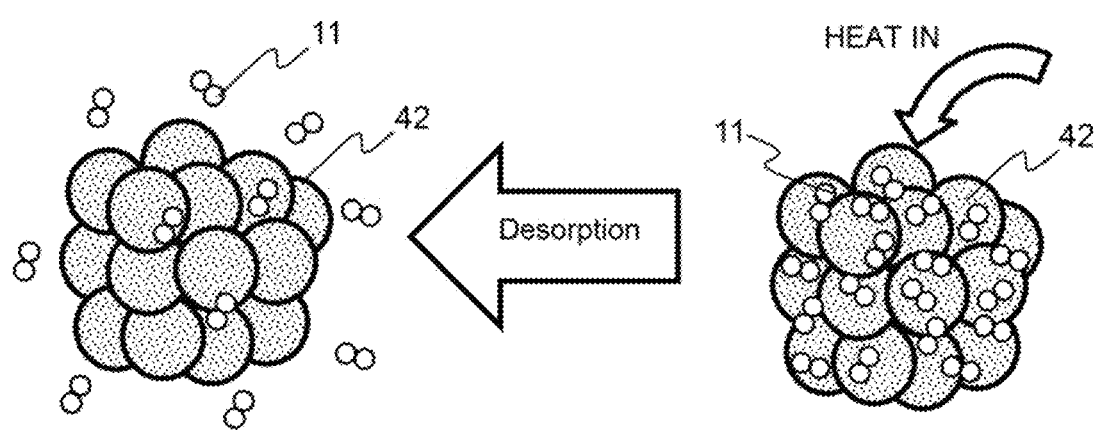
FIG. 2 shows metal hydride during desorption.

As shown in FIGS. 1 and 2, metal hydrides 42 release heat when hydrogen is absorbed and receives heat when the hydrogen is desorbed from the metal hydride. Absorption is exothermic, releasing heat, and desorption is endothermic, conducting heat. The metal hydride may be a hydride forming alloy 43, as described herein.

Figure 3:
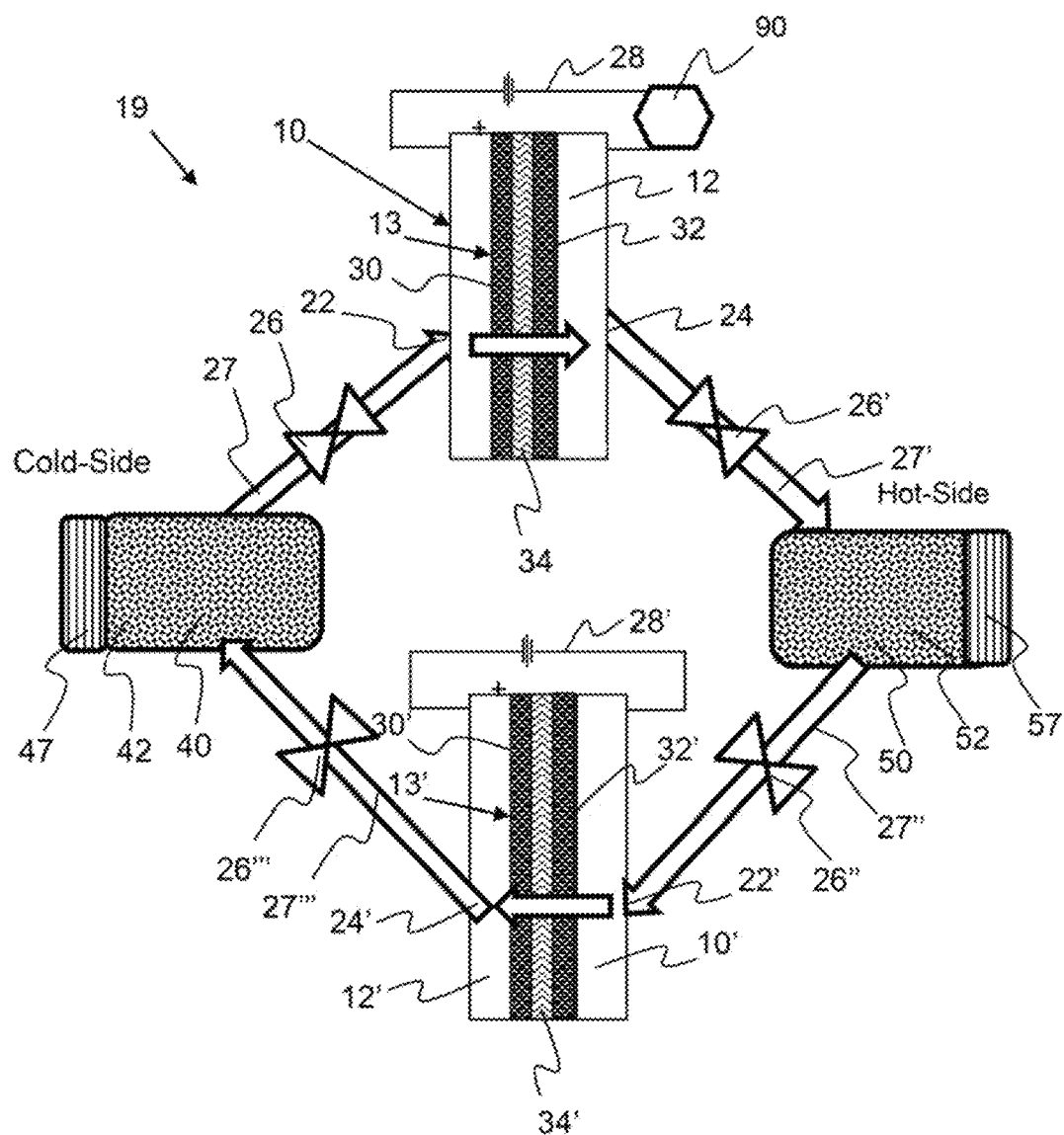
FIG. 3 shows an exemplary process flow diagram.

As shown in FIG. 3, an exemplary electrochemical heat transfer system 19 comprises an electrochemical heat transfer device 10 comprising an electrochemical compressor 12, such as a hydrogen compressor, that is coupled to at least one metal hydride reservoir 40 that contains a metal hydride-forming alloy 43, such as in a packed bed. The metal hydride reservoir is in thermal communication with heat exchanger 47, or with an object to be heated. The metal hydride reservoir or housing, or portion thereof, may be a heat exchanger 47 and be in thermal communication with an object to be heated or cooled or have a fluid flowing through it. The electrochemical heat transfer system may be configured as a heating device, wherein the heat exchanger is coupled with a metal hydride reservoir that is absorbing hydrogen and thereby releasing heat. The electrochemical heat transfer system may be configured as a cooling device, wherein the heat exchanger is coupled with a metal hydride reservoir that is desorbing hydrogen and thereby conducting heat. The electrochemical heat transfer system may be configured as a heating and cooling device, wherein the heat exchangers of the absorbing and desorbing metal hydride reservoirs are in thermal communication with an object or volume of air to be heated and cooled, respectively. The absorption of hydrogen gas into suitable metal alloy leads to the exothermic formation of a metal hydride, producing useful heat as shown in FIG. 1. The endothermic desorption of hydrogen gas is reversible, requiring about as much heat as that released by absorption, which thereby produces useful cooling as shown in FIG. 2.

As shown in FIG. 3, two separate electrochemical compressors 12, 12', or hydrogen compressors are configured in a closed loop between a first metal hydride reservoir 40 and a second metal hydride reservoir 50. Conduits 27-27''' couple the components of the system and enable hydrogen to flow between the electrochemical compressors and the metal hydride reservoirs. A series of valves 26-26''' are controlled by the controller 90 and are opened and closed to enable hydrogen flow as required. The controller also controls the electrochemical compressors, wherein the voltage and/or current is controlled to produce a flow of hydrogen across the membrane electrode assembly 13. The first metal hydride reservoir 40 is desorbing hydrogen to the first electrochemical compressor 12 and therefore conducting heat, or is the cool reservoir. The second metal hydride reservoir 50 is absorbing hydrogen from the first electrochemical compressor 12 and is releasing heat, or is the hot side. Valves 26 and 26' are open during this process and valves 26" and 26''' are closed. After the hydrogen has been pumped from the first metal hydride reservoir 40 to the second metal hydride reservoir 50 the valves 26" and 26''' may opened and vales 26 and 26' may be closed to allow the hydrogen, now in the second metal hydride reservoir 50 to be pumped to the first metal hydride reservoir 40 by the second electrochemical compressor 12', Each of the metal hydride reservoirs contains a volume of metal hydride 52.

Figure 4:
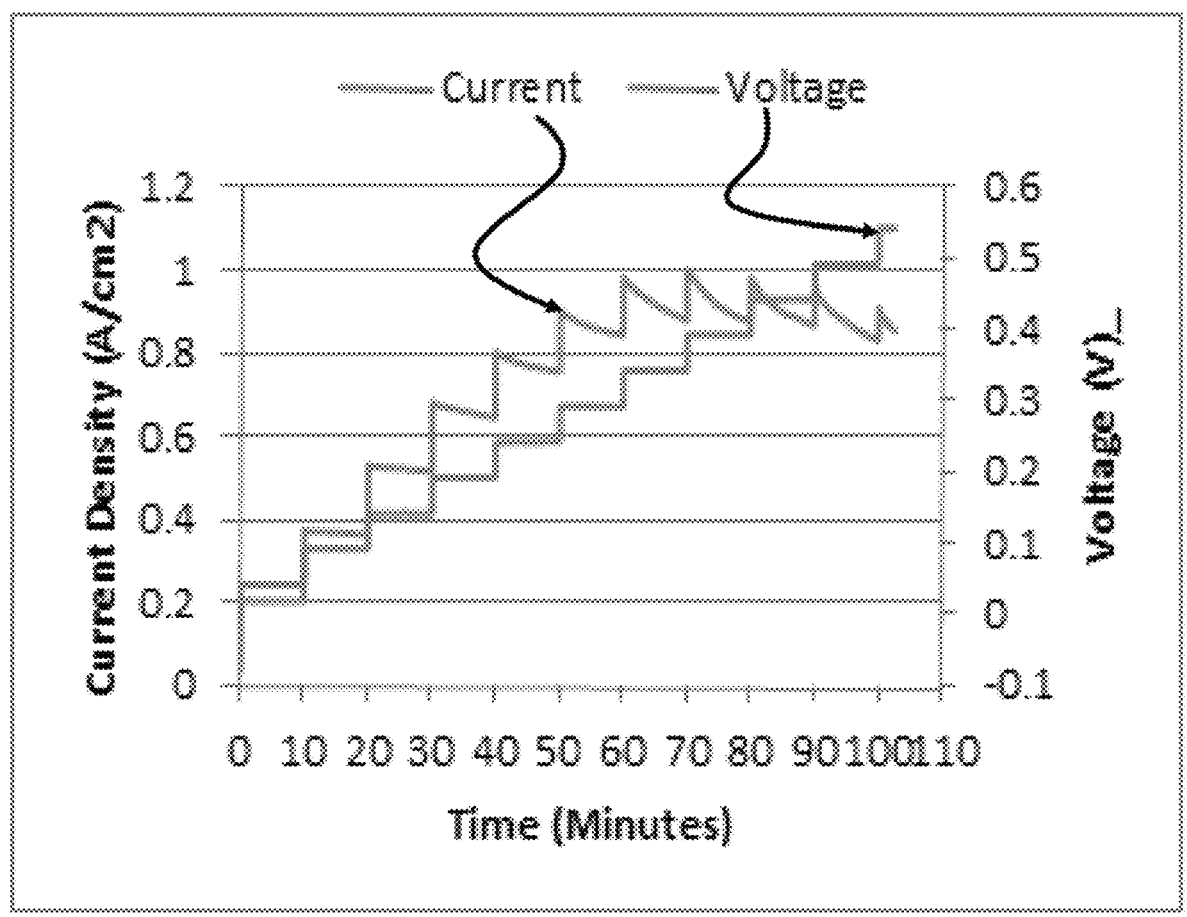
FIG. 4 shows an exemplary polarization curve.

A polarization curve utilizing the membrane in hydrogen compression mode is show in FIG. 4. The performance of the ECC-driven heat pump system will vary depending on the specific metal hydride composition. LaNi5 has been used for heat pumping in the past. Preferably a LaNi(4.7) Al(0.3) has been shown to operate with a better pressure ratio that is better suited for electrochemical compression, wherein there may be a low pressure requirement of 7 psi and high pressure requirement of 28 psi. This pressure range is well suited for domestic hot water applications. For enhanced heat transfer from the packed bed, a metal hydride reservoir may have a tubular geometry with an aspect ratio, cylinder height to diameter, of at least 5, or at least 10, so as to minimize radial thermal gradients in the packed hydride bed. Heat transfer within the packed bed will be augmented by adding thermal-conductivity enhancing materials such as aluminum foam in order to overcome the metal hydride's low thermal conductivity. A thermally conductive material or network may be configured within the metal hydride reservoir. Effective heat transfer to and from the metal hydride packed bed governs its rate of hydrogen charging and discharging, which in turn governs the ability of the electrochemical compressor to drive or pump hydrogen and therefore the overall heat transfer rates. The quicker heat and be conducted and released the higher the heat transfer rate to a heat exchanger or to an object.

Figure 5:
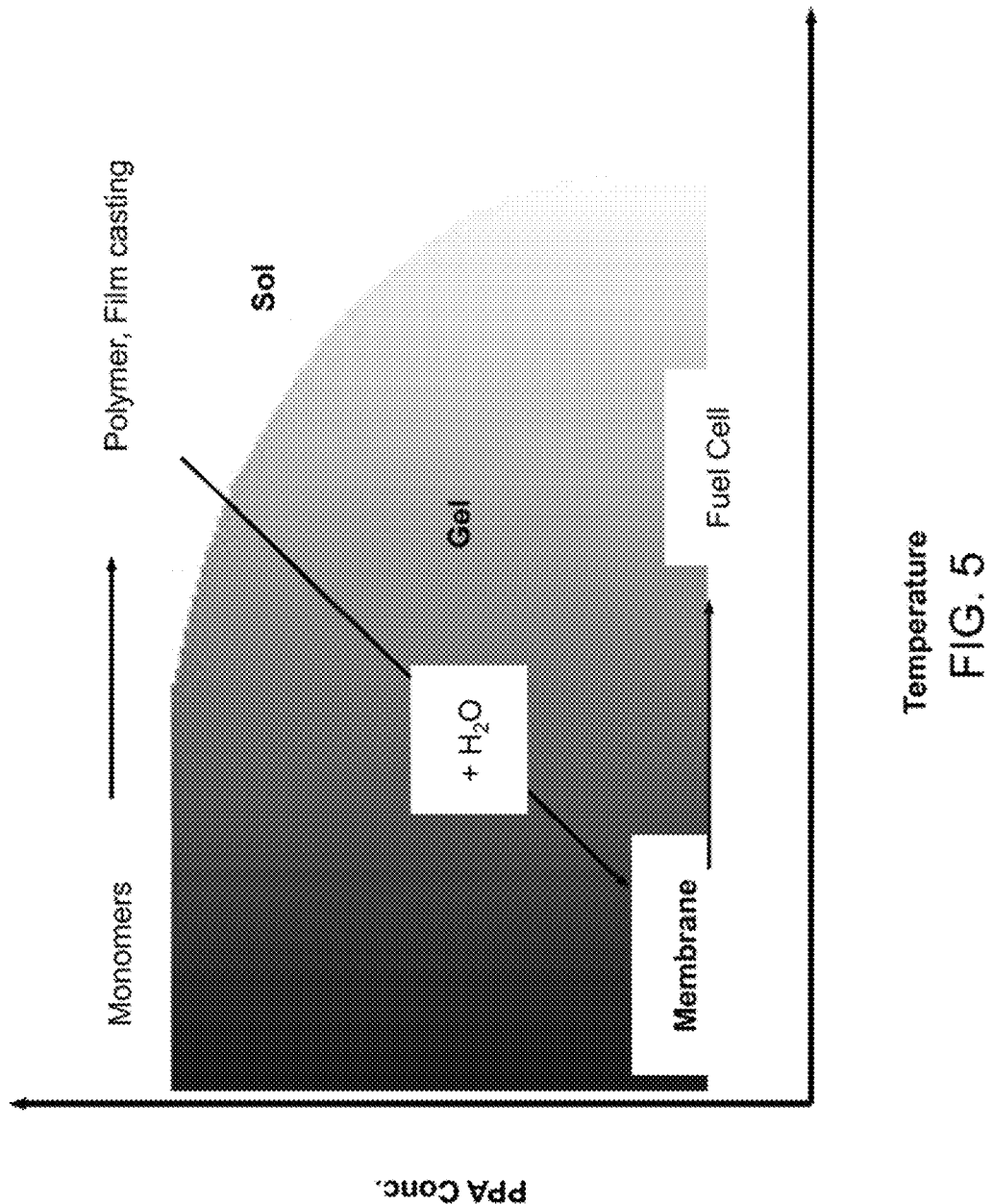
FIG. 5 shows a graph of some of the properties of the TPS films.

FIG. 5 shows a graph of some of the properties of the TPS films. The graph shows the phosphoric acid (PPA) concentration as a function of increasing temperature. The TPS functions well with very low moisture content at high temperatures.

Figure 6:
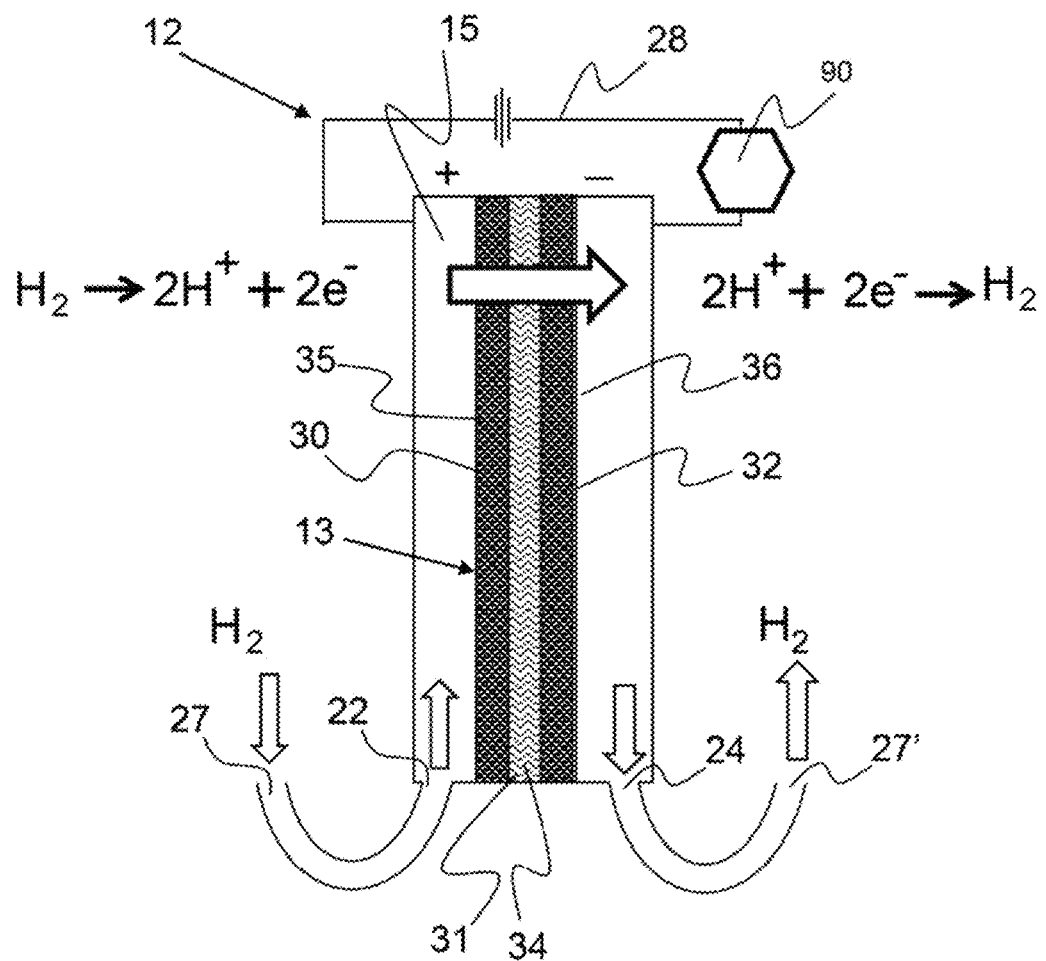
FIG. 6 shows a schematic of an electrochemical cell of an electrochemical pump.

FIG. 6 shows a schematic of an electrochemical cell of an electrochemical pump. The electrochemical compressor 12 comprises a membrane electrode assembly 13 comprising an anode 30, a cathode 32 and an ionomer layer 34 configured there between. The ionomer layer 34 may be a proton exchange polymer 31 or a composite ionomer membrane comprising a proton exchange polymer, for example. The pressure on the anode side 35 will be less than the pressure on the cathode side 36 of the membrane electrode assembly, as the compressor is pumping hydrogen from the anode side to the cathode side. The pump is driven by a power source 28 that is electrically connected to the anode and cathode to drive the reactions provided in FIG. 5. The electrochemical compressor 12, or hydrogen pump 15, is configured with an inlet 22 and outlet 24. A conduit 27 extends from the inlet to a first metal hydride portion that is desorbing hydrogen and conducting heat, and conduit 27' extends from the outlet to a second metal hydride portion that is absorbing hydrogen and releasing heat.

Figure 7:
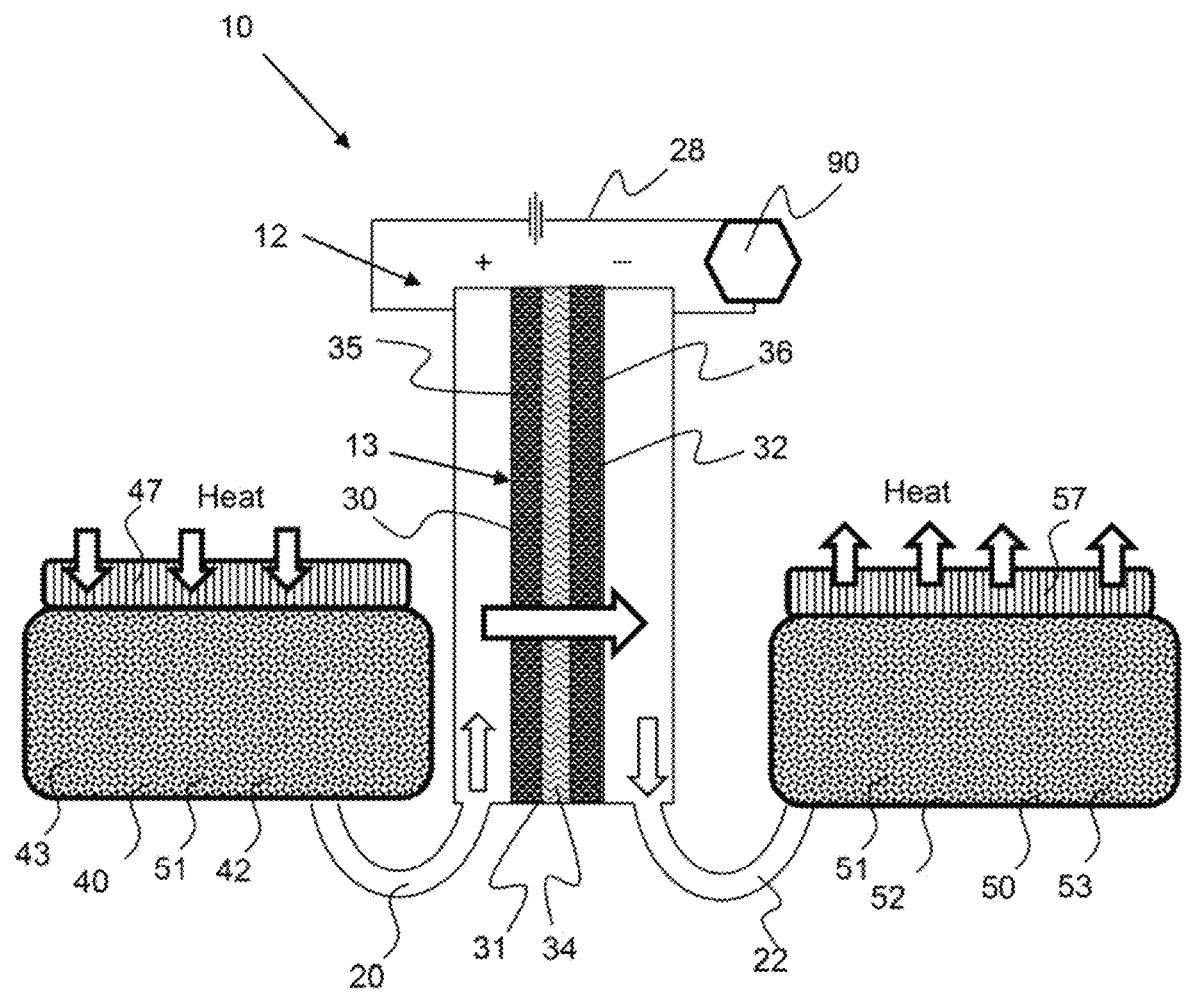
FIG. 7 shows an exemplary metal hydride heat pump.

FIG. 7 shows an exemplary metal hydride electrochemical heat transfer device 10 that comprises an electrochemical hydrogen compressor 12. The electrochemical compressor 12 pumps hydrogen from an anode side 35, and from a first metal hydride reservoir 40 across the membrane electrode assembly 13 to the cathode side 36 and into a second metal hydride reservoir 50 such as a tank or enclosure for the metal hydride forming alloy 53 material. The metal hydride 52 material may be a packed bed or a monolith for example. The metal hydride reservoir may comprise an additive 51 such as fluoropolymer, silica or metal such as copper, to aid in expansion and contraction of the metal hydride. The compressor may be reversed, wherein the controller 90 changes the potential of the power supply 28 to switch the anode to the cathode the cathode to the anode. In this way, hydrogen can be pumped back and forth between the two metal hydride reservoirs. Heat transfer devices 47, 57 are coupled to the metal hydride portion 40, 50' respectively. The heat transfer device may transfer heat to and/or from the metal hydride reservoir to an article or to the air or environment. A heat transfer device may comprise fins, a conduit for a flow of a heat transfer fluid, a conducting plate, and the like.

Figure 8:
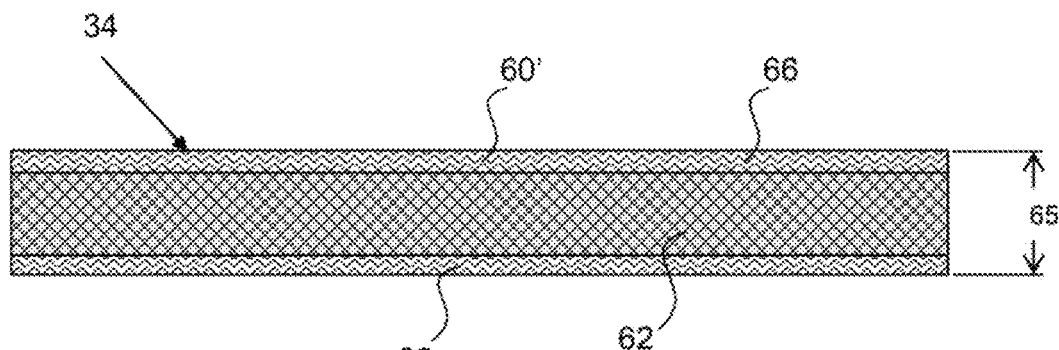
FIGS. 8 to 10 show a cross-sectional views of a composite ionomer membrane comprising a reinforcing material.
Figure 9:
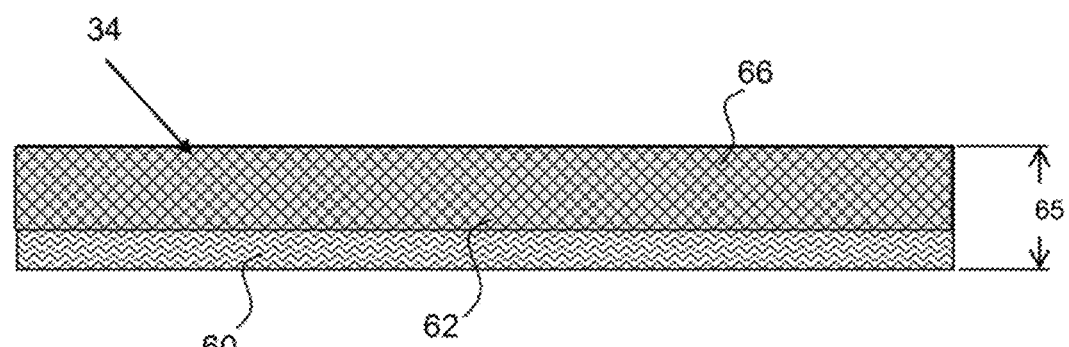
Figure 10:
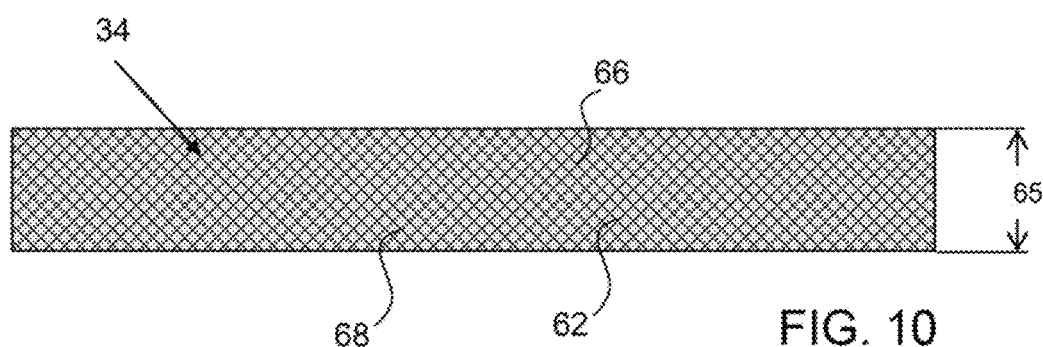

As shown in FIG. 8 through 10, an ionomer layer 34 is a composite ionomer membrane 66 having a reinforcing material 62. The reinforcing material 62, such as a membrane or discrete reinforcing elements or fibers, may be configured within the ionomer 60, wherein the ionomer is exposed on either side of the reinforcing material, as shown in FIG. 7. In an alternative embodiment, the reinforcing material is configured to one side of the composite ionomer membrane 66, as shown in FIG. 8. In another embodiment, the reinforcing material 62 extends through the thickness 65 of the composite ionomer membrane 66 wherein there is substantially no ionomer layer on the top or bottom surface, as shown in FIG. 9. The composite ionomer membrane may be very thin to enable quick transfer of hydrogen and therefor a higher heating flux rate. The composite ionomer membrane may be about 30 μm or less, about 25 μm or less, about 20 μm or less, about 15 μm or less, about 10 μm or less, about 5 μm or less. The ionomer 60 interpenetrates the reinforcing material 62. The ionomer and/or the composite ionomer may have an additive 68, to improve performance such as silica or other desiccant particles, or reinforcing materials, as described herein.

Figure 11:
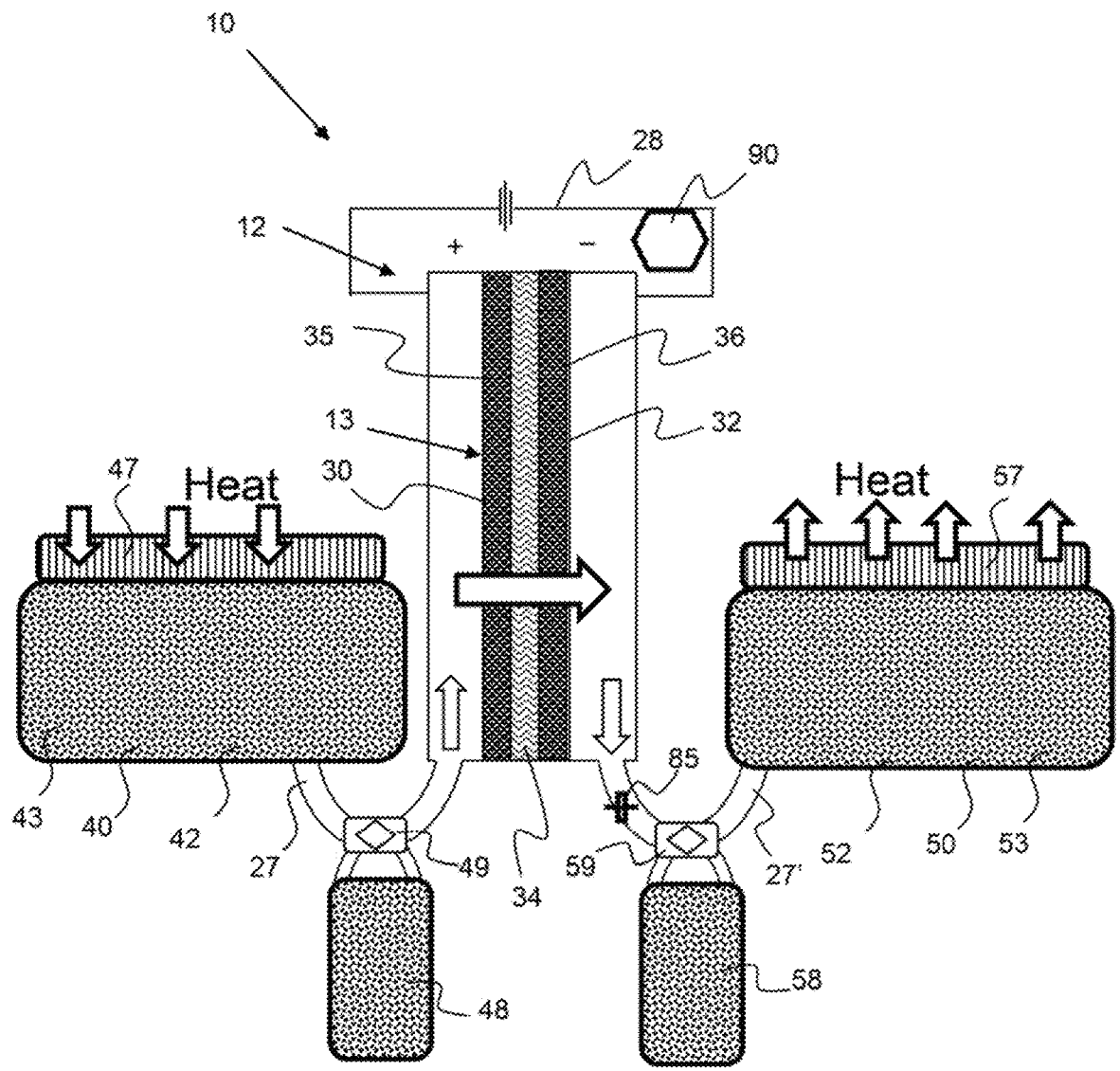
FIG. 11 shows a schematic of an exemplary heat transfer system comprising a desiccation unit.

As shown in FIG. 11, an exemplary electrochemical heat transfer device 10 comprises desiccation units 48 and 58 configured between the metal hydride portion 40 and 50 and the electrochemical compressor 12, respectively. The first metal hydride reservoir 40 is coupled to the desiccation unit by conduit 27 and a desiccation valve 49 can be opened to flow hydrogen into the desiccation unit 48, or bypass it. Likewise, the second metal hydride reservoir 50 is coupled to the desiccation unit by conduit 27' and a desiccation valve 59 can be opened to flow hydrogen into the desiccation unit 58, or bypass it. The desiccation valves may be used to force a flow of hydrogen through the desiccation unit as needed. A humidity sensor 85 may monitor the humidity level and a control system 90 may open and close the valve to the desiccation unit as a function of the humidity level measures, whereby it opens the valve for gas desiccation when the humidity exceeds a threshold value, such as 1% or more, or 2% or more, or 5% or more. A heat exchanger 47 is coupled with the first metal hydride reservoir 40 to conduct heat into the metal hydride 42 and a heat exchanger 57 is coupled with the second metal hydride reservoir 50 to conduct heat from the metal hydride 52, as indicated by the bold arrows.

Figure 12:
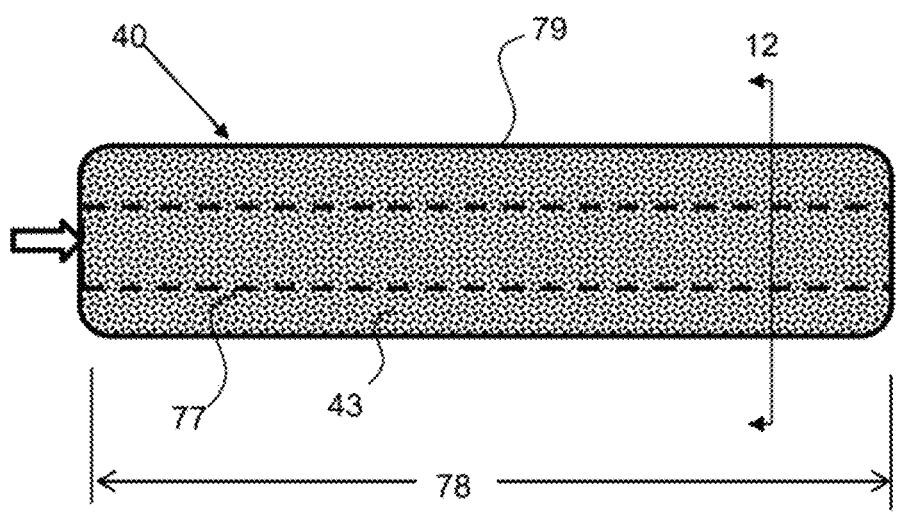
Figure 13:
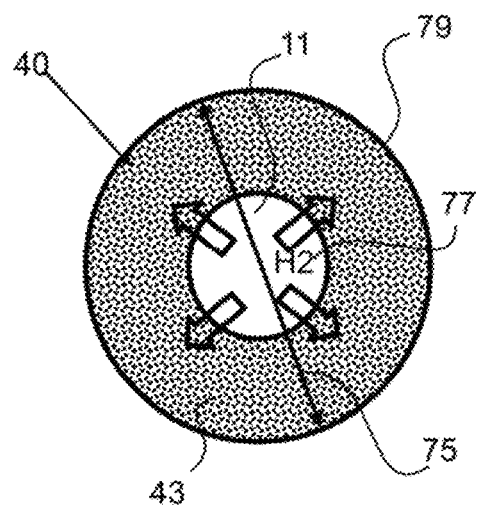

As shown in FIGS. 12 and 13, a metal hydride reservoir 40 comprises a tube 79 having an interior mandrel 77 for distributing the hydrogen gas 11 to the metal hydride forming alloy 43. The mandrel 77 provides an open conduit to distribute the hydrogen gas down along the tube and into the metal hydride forming alloy configured between the mandrel and the interior wall of the tube. A tube may be circular in cross-sectional shape, as shown or take any other suitable cross-sectional shape, such as polygonal, square, rectangular irregular and the like. A large aspect ratio, length 78 of the tube to outer diameter 75 of the tube may be large, such as greater then 5, and preferably greater than 10, to provide quick transfer of hydrogen to the metal hydride and to enable quick heat transfer rates.

Figure 14:
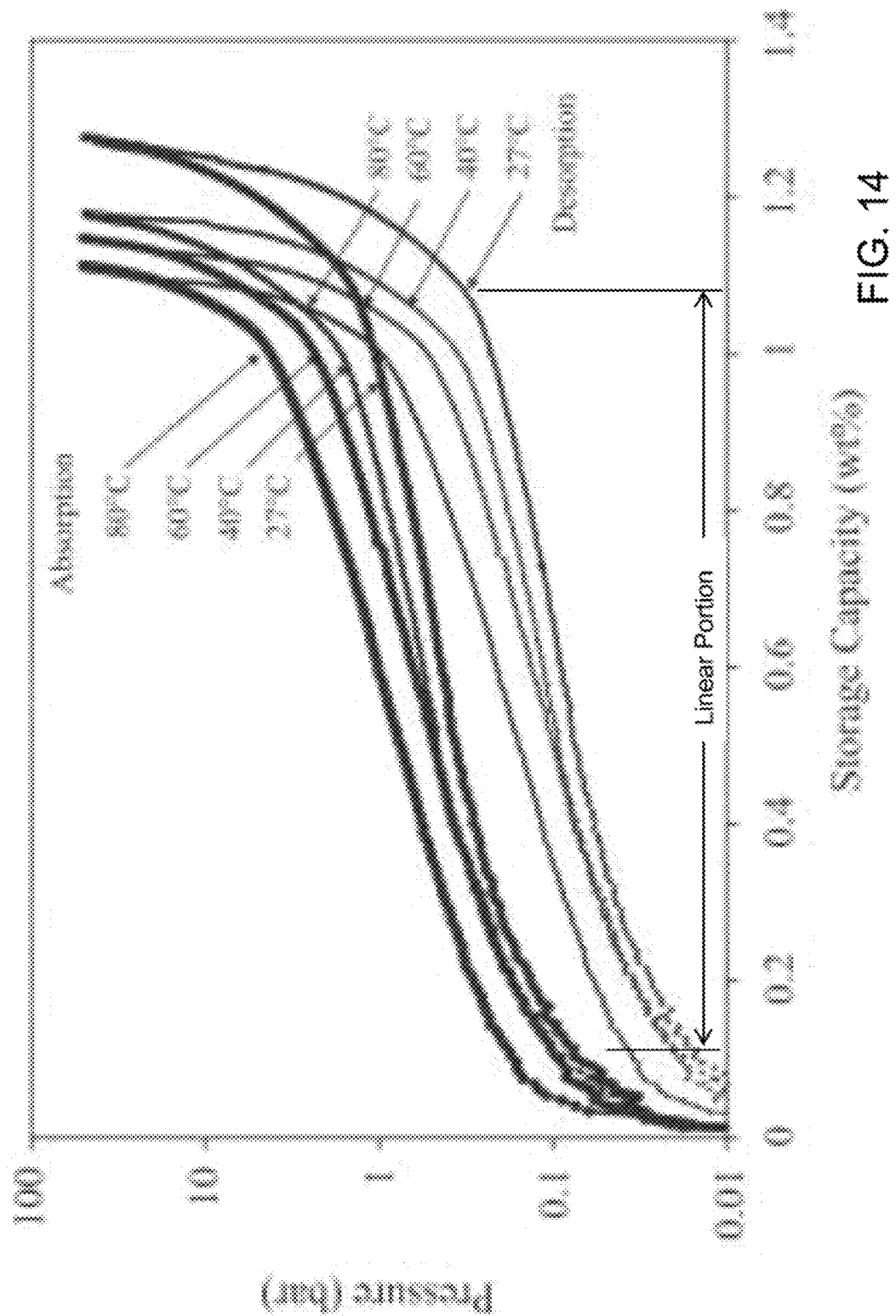
FIG. 14 shows isotherms for metal hydrides.

FIG. 14 shows exemplary isotherms of metal hydrides wherein the absorption pressure is higher than the desorption pressure. There is a linear region for the absorption and desorption.

Figure 15:
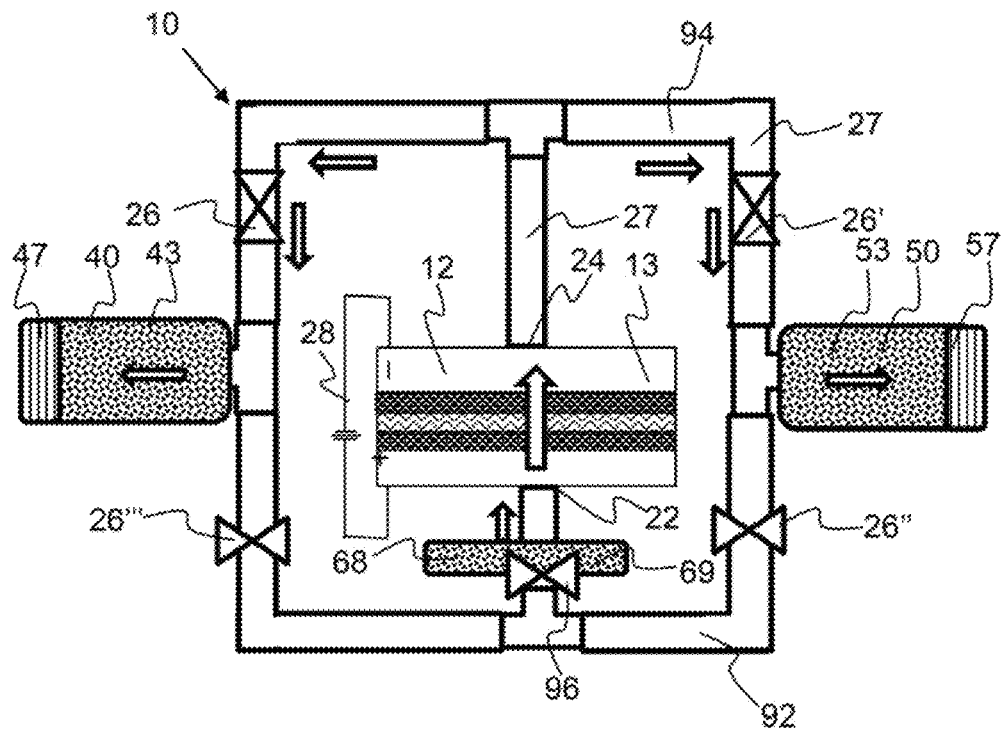
FIGS. 15 and 16 show an exemplary electrochemical heat transfer system having two separate metal hydride portions and a desiccation unit.
Figure 16:
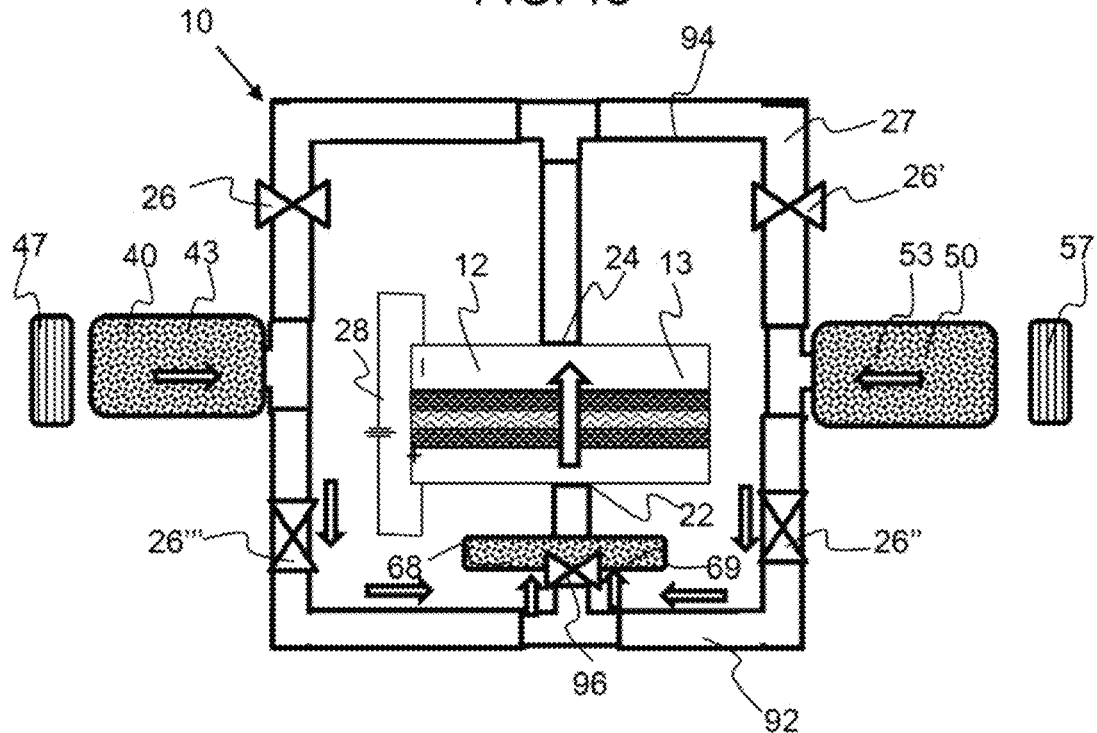

As shown in FIGS. 15 and 16 an exemplary electrochemical heat transfer device 10 comprises a single electrochemical compressor 12 and a closed loop system that transfers hydrogen from a plurality of metal hydride reservoirs 40, 50, to a hydrogen reservoir 69 which may be a desiccant unit 69. As shown in FIG. 15, the electrochemical compressor 12 is pumping hydrogen from the desiccant unit 69 to the two metal hydride reservoirs 40, 50 and valves 26" and 26'" are closed. As shown in FIG. 16, the electrochemical compressor 12 is pumping, hydrogen from the two metal hydride reservoirs 40, 50 to the desiccant unit 69 and valves 26 and 26' are closed. A heat transfer device 47, 57 is in thermal communication with first and second metal hydride reservoirs 40, 50, respectively. The heat exchangers may engage and disengage in thermal communication with the metal hydride reservoirs depending on the application. For example, when the exemplary electrochemical heat transfer device 10 is configured as a heater, the heat transfer devices may be in thermal communication with the metal hydride reservoirs during absorption of hydrogen, as shown in FIG. 15 and detached when desorbing hydrogen, as shown in FIG. 16. The desiccant unit may be most effectively configured between the electrochemical compressor and the hydride reservoir, or just before a hydride reservoir.

Figure 17:
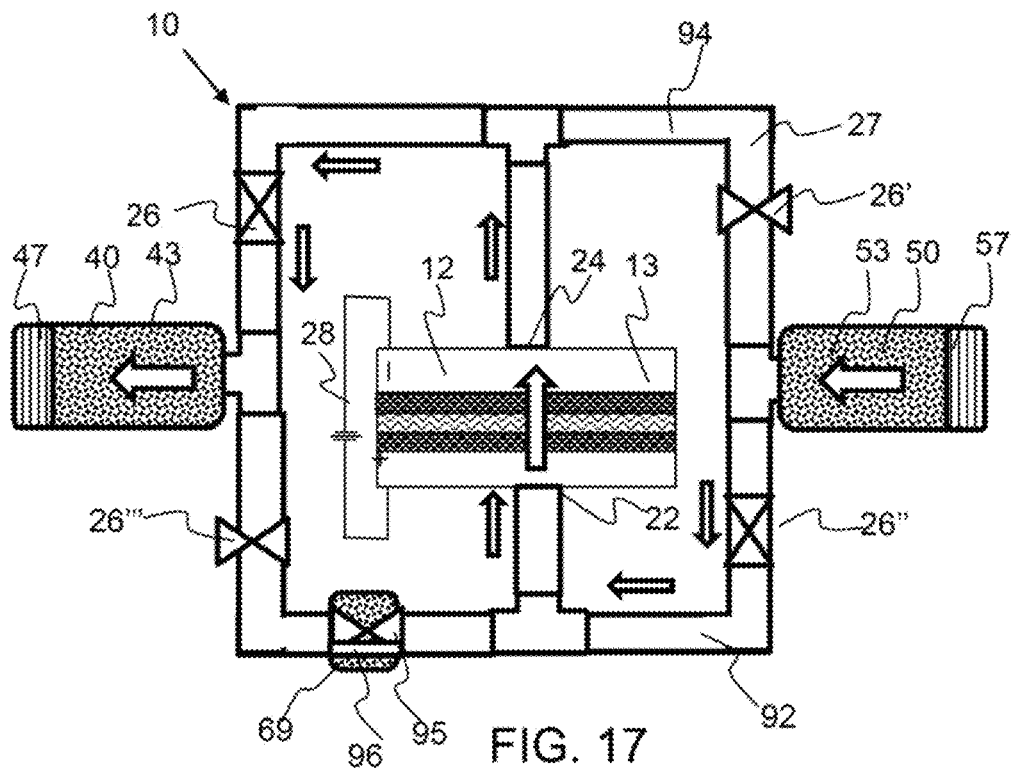
FIGS. 17 and 18 show an exemplary electrochemical heat transfer system having two separate metal hydride portions and series of valves to flow hydrogen from one metal hydride portion to the other.
Figure 18:
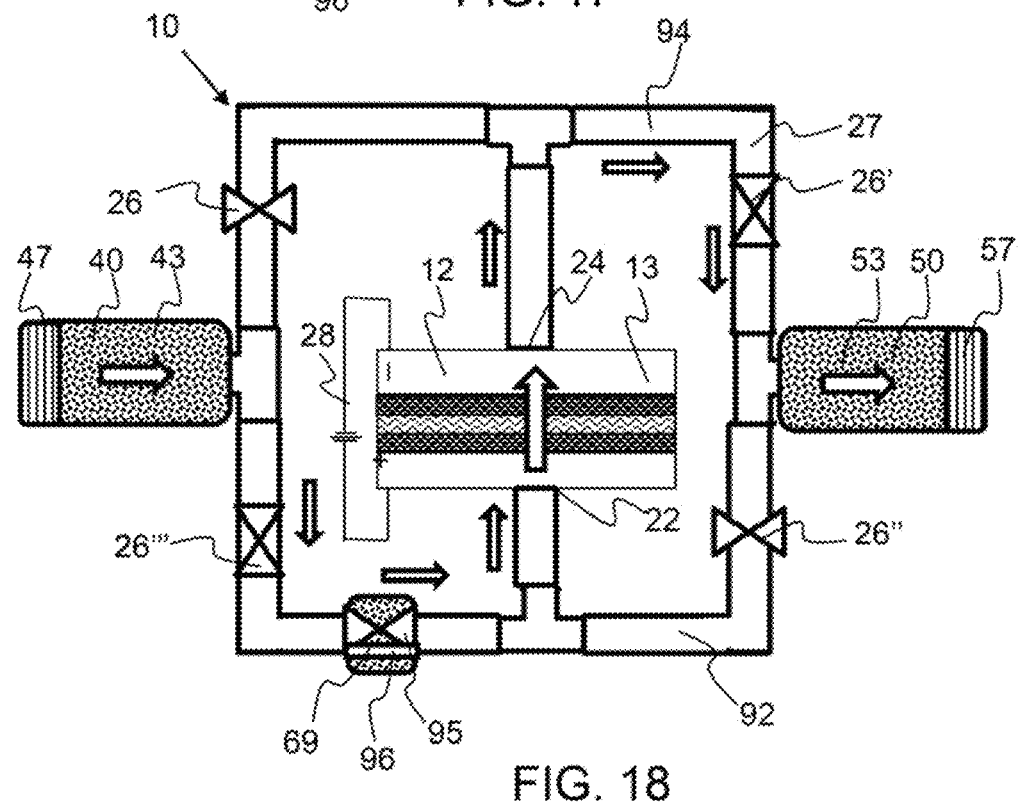

As shown in FIGS. 17 and 18, an exemplary electrochemical heat transfer device 10 is configured to pump hydrogen from a first metal hydride reservoir 40 to a second metal hydride reservoir 50 and vice versa. As shown in FIG. 17, the first metal hydride reservoir is receiving and absorbing hydrogen that is pumped by the electrochemical compressor 12 from the second metal hydride reservoir 50. As shown in FIG. 18, the second metal hydride reservoir 50 is receiving hydrogen that is pumped by the electrochemical compressor 12 from the first metal hydride reservoir. The hydrogen goes through a desiccant unit 69 during this step. It is to be understood that a desiccant unit may be configured on both portion of the loop. Also, a bypass conduit 96 may extend around the desiccant to allow the hydrogen to bypass the desiccant unit. A desiccant bypass valve 95 may open to allow the working fluid to bypass an desiccant unit 69.

As shown in FIGS. 17 and 18, the conduits 27 forms a closed loop with the two metal hydride reservoirs 40, 50, coupled to the loop. An outlet portion conduit 94 couples the metal hydride reservoirs 40 and 50 on the outlet side, of the electrochemical compressor and an inlet portion conduit 92 couples the metal hydride reservoirs 40 and 50 on the inlet side of the electrochemical compressor. There is a first outlet portion valve 26 configured between the electrochemical hydrogen compressor and the first reservoir 40 on the outlet portion conduit 94 of the closed loop. There is a second outlet portion valve 26' configured between the electrochemical hydrogen compressor 12 and the second reservoir 50 on the outlet portion of the closed loop. There is a first inlet portion valve 26'" configured between the electrochemical hydrogen compressor 12 and the first reservoir 40 on the inlet portion 92 of the closed loop. There is a second inlet portion valve 26" configured between the first electrochemical hydrogen compressor 12 and the second reservoir 50 on the inlet portion 92 of the closed loop. This configuration, with the electrochemical compressor coupled to the closed loop, with the outlet of the compressor coupled to the outlet portion 94 of the closed loop and between valves 26 and 26' and coupled to the inlet portion 92 of the closed loop and between valves 26' and 26'", enables working fluid to be pumped in one direction and cycled from metal hydride reservoirs by opening and closing the valves as shown. This unique plumping configuration and method of opening valves enables streamline operation of the heat transfer system.

Figure 19:
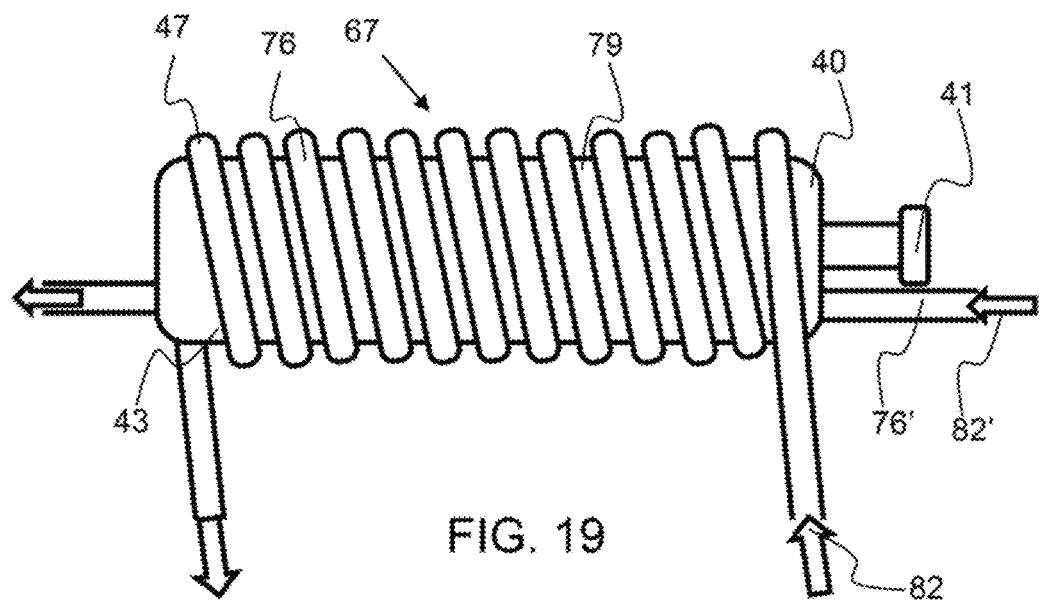
FIG. 19 shows an exemplary metal hydride heat exchanger having a secondary loop for transfer of heat from the metal hydride heat exchanger.

FIG. 19 shows an exemplary metal hydride heat exchanger having a metal hydride reservoir 40 and a heat exchange device 47. The metal hydride reservoir is a tube 79 that contains a metal hydride 43. The heat exchanger device 47 comprises a heat transfer conduit 76 that is coiled around the tube, or cylinder and a heat transfer fluid 82 passes through the conduit. The heat transfer device 47 also comprises a heat transfer conduit 83' that is in direct communication with the metal hydride. As shown, the heat transfer conduit 83' passes through the cylinder or tube, wherein the conduit is in direct contact with the metal hydride 43. The interior heat transfer conduit 76' may be coiled around the interior of the cylinder to increase thermal conductivity. The heat transfer fluid may be a gas, or a liquid, such as water. Any suitable type of heat exchange fluid may be configured to flow through secondary loop as described herein.

Figure 20:
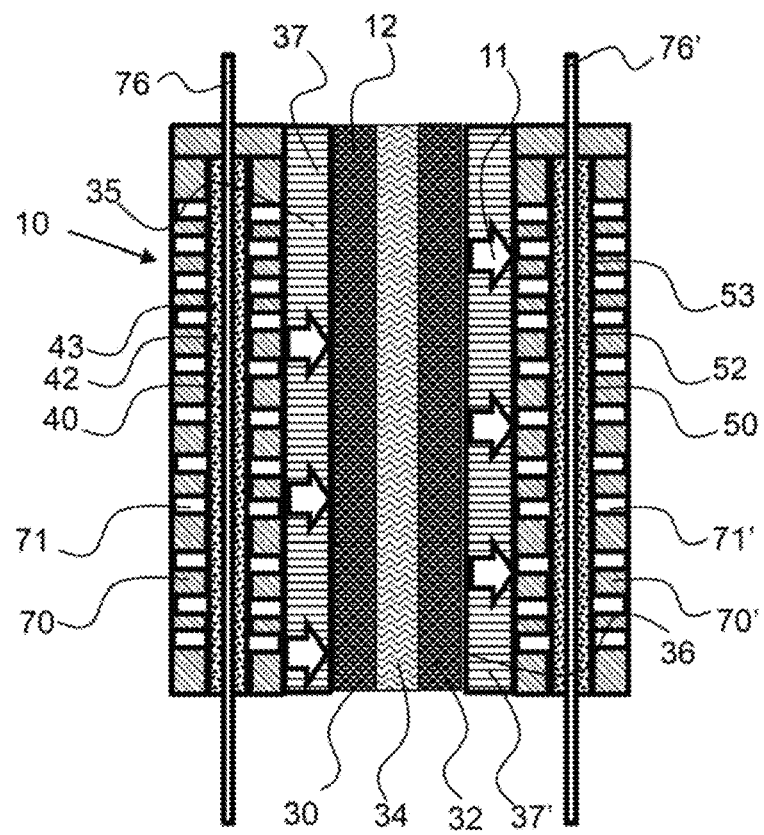
FIG. 20 shows a diagram of an exemplary integrated electrochemical compressor and metal hydride heat exchanger.

FIG. 20 shows an exemplary electrochemical compressor 12 having side ports, or channels 71 for receiving hydrogen 11. Metal hydride reservoirs 40, and 50 are configured on the anode and cathode sides of the membrane electrode assembly 13. Hydrogen flows through the channels and into and out of the metal hydride 42, 52. The hydrogen then flows from the anode side 35 to the cathode side 36. Note that the narrow and long with side porting increase the distribution rate of hydrogen to the metal hydride reservoir and therefore increases heat transfer rates. In addition, this type of side porting reduces pressure drop of hydrogen into and out of the electrochemical cell. The hydrogen has to pass from the channels 71 through the gas diffusion media 37 to the electrode, anode or cathode. This quick distribution of hydrogen to the membrane electrode assembly can also increase current density, as the fuel is, not limiting. As shown in FIG. 20, heat exchange conduits 76, 76' extend through the electrochemical cell, and are in direct physical contact with the metal hydride reservoirs, 40, 50 respectively. A heat exchange fluid may flow though the conduit to exchange heat with the metal hydride 52. In another embodiment, instead of heat exchange conduits, a heat exchange element may extend through the cell and be in contact with the metal hydride reservoir and extend out from the cell to act as heat conductors, or fins. Air flowing over the extended fins, may carry heat to or from the electrochemical cell.

Figure 22:
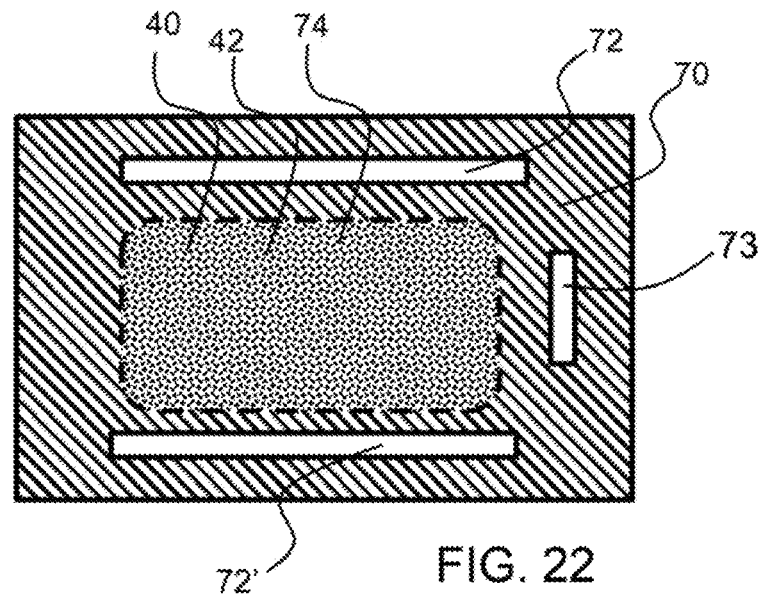
FIG. 22 shows a diagram of an exemplary integrated electrochemical compressor and metal hydride heat exchanger having a heat transfer fluid conduit configured through the cell.
Figure 21:
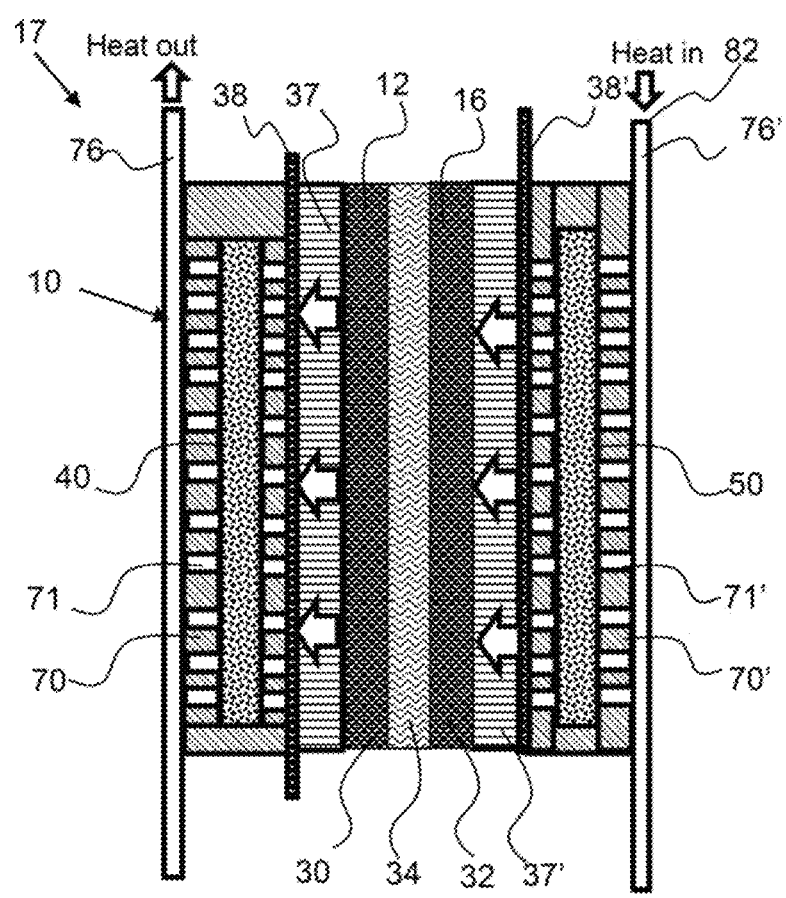
FIG. 21 shows a diagram of an exemplary integrated electrochemical compressor and metal hydride heat exchanger.

FIG. 21 shows an exemplary integrated electrochemical compressor and metal hydride heat exchanger 17. As shown, the electrochemical cell 16 is configured between heat exchange conduits 76, 76. As described herein any number of electrochemical cells may be configured in series in the heat exchanger. The bipolar plate 70, or plate with channels 71 configured to distribute a working fluid, i.e. hydrogen, over the surface of the gas diffusion media 37 is in thermal communication with the heat exchange conduits 76. A current collector 33 is shown being in, electrical contact with the gas diffusion media 37 and the bipolar plate 70. A bipolar plate may have a serpentine channel or a series of channels that, are coupled together to a common channel or inlet. As shown in FIG. 22 a metal hydride 42 that is coupled to, configured in, on is an integral part of the bipolar plat 70. The bipolar plate comprises a metal hydride bed 74 that forms the metal hydride reservoir 40, and may be a recessed region in the bipolar plate. The metal hydride in a bipolar plate is in fluid communication with the channels or conduits of the bipolar plate and thereby can produce heat upon absorption of the working fluid, hydrogen. The heat exchange conduits 76, 76' enable a heat transfer fluid 82 to carry heat generate by the metal hydride away from the electrochemical cell. As shown in FIG. 22, a heat exchange port 72 may be configured through the bipolar plate to allow a heat transfer fluid to pass therethrough. FIG. 22 also shows a fuel port 73, for supplying hydrogen to the electrochemical cell 16.

Figure 23:
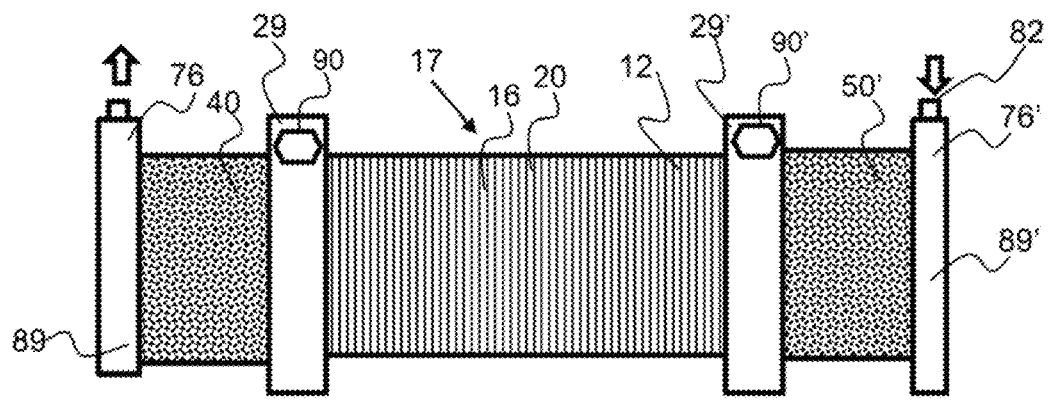
FIG. 23 shows a diagram of an exemplary simplified end plate design for n electrochemical cell.

Referring now to FIG. 23, an exemplary integrated electrochemical compressor and metal hydride heat exchanger 17 has a heat transfer fluid conduit 76 in thermal communication with the metal hydride reservoir 40. A first heat exchange conduit 76 may extend on the anode side of the cell and a second conduit may extend only on the cathode side of the cell stack 20 and a second heat exchange conduit 76 may extend on the cathode side of the cell. A heat conduit may extend over a plurality of the electrochemical cells 16, or down over the electrochemical stack. One heat exchange conduit may extend over the cells that are absorbing hydrogen and releasing heat, while the other may extend over, or be in thermal communication, with the cells that are desorbing hydrogen and conducting heat. A heat exchange conduit may extend from one side of a cell, the anode side, to a cathode side, especially when there are two or more cells, or a cell stack 20. Since the metal hydride reservoirs alternate between hot and cold, it is possible that a bipolar plate could be hot on one side and cold on another. It is therefore preferable for adjacent cells to alternate in polarity so that two hot sides, or two cathodes, are always adjacent to each other and the bipolar plate, as show in FIG. 24. Also, it is preferable that the plumbing of the heat exchange fluid alternate between adjacent cells so that it can draw the cool and hot side thermal transfers separately.

Figure 24:
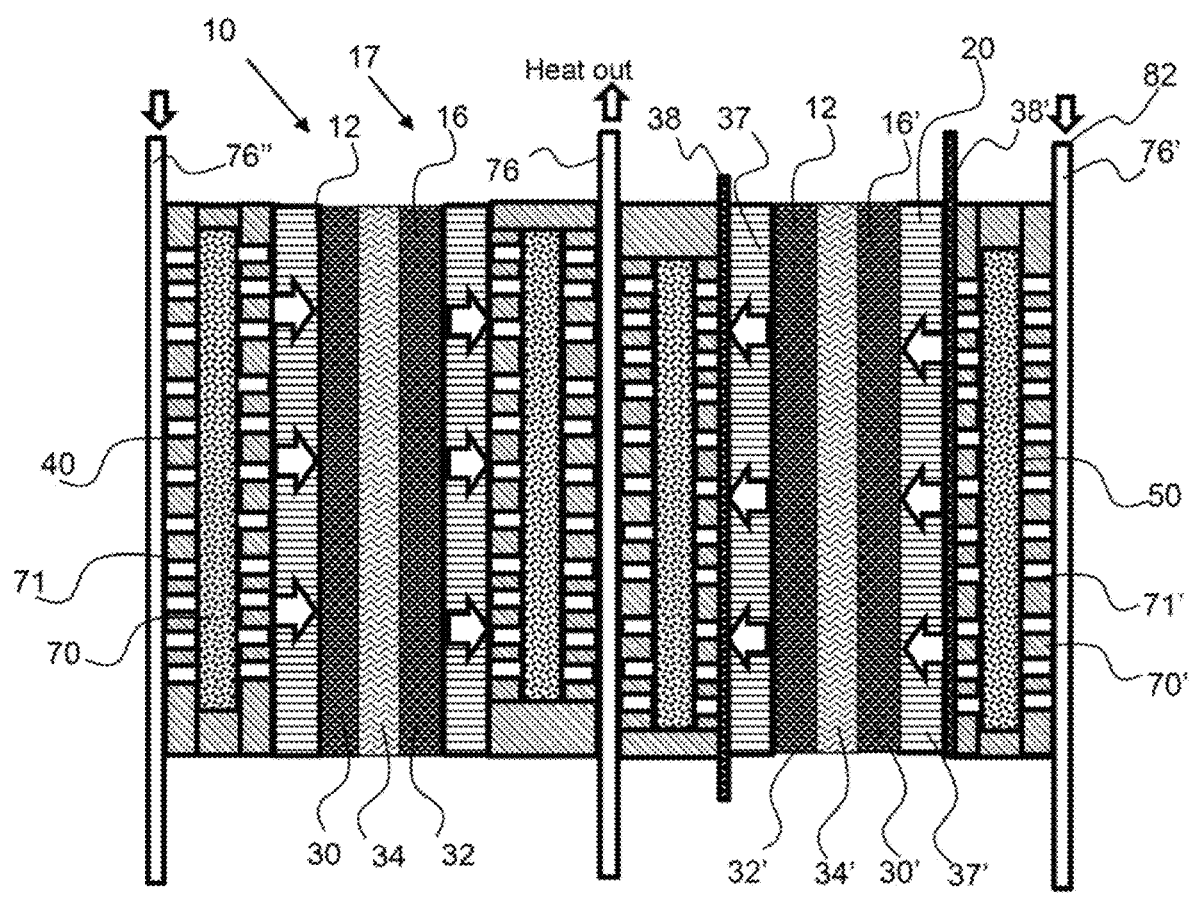
FIG. 24 shows an exemplary electrochemical stack having the cathodes of adjacent cells configured adjacent each other.

As shown in FIG. 24, two electrochemical cells 16, 16' are configured in a cell stack 20, wherein the two cathodes 32, 32', are configured adjacent each other with a heat exchange conduit 76 extending therebetween. The anodes 30, 30' are configured on the outside of the cell stack 20 and they may have another anode facing each of them. This alternating configuration simplifies plumbing and puts the exothermic sides of adjacent cells, the cathodes, adjacent each other and the endothermic sides, the anodes, adjacent each other.

Figure 25:
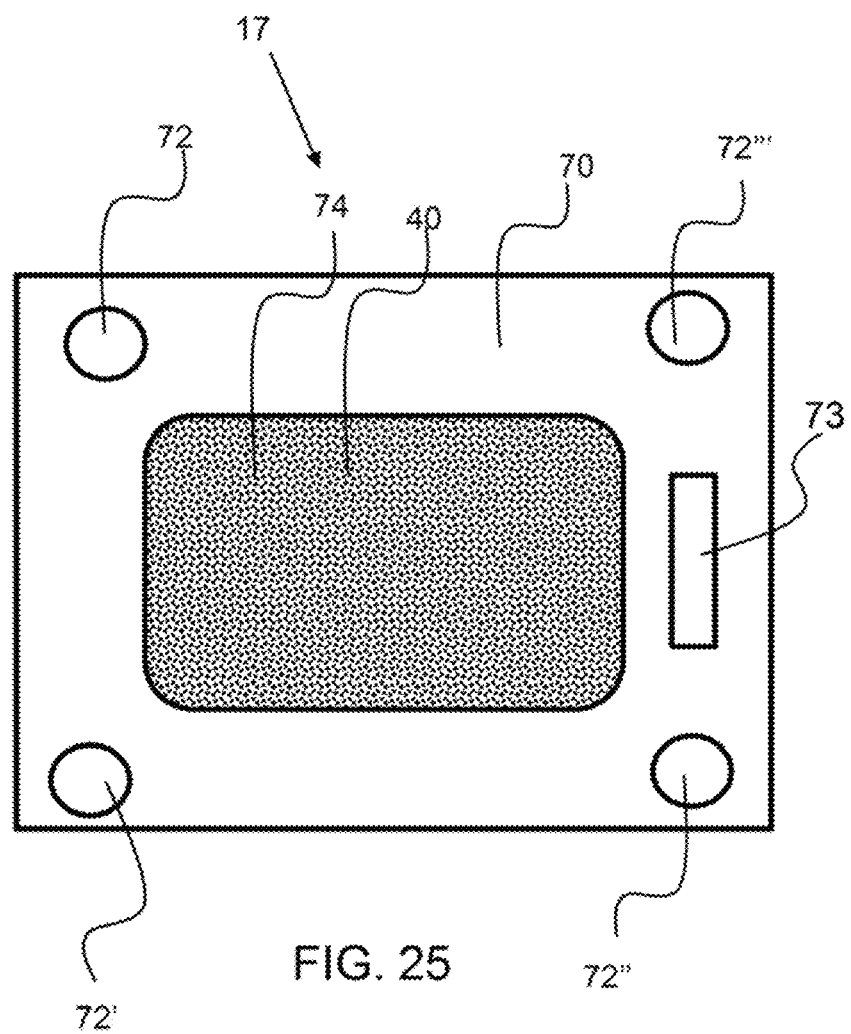
FIG. 25 shows a diagram of an exemplary electrochemical cell having integrated cell channels and connections.

FIG. 25 shows a diagram of an exemplary simplified end plate 89 for an exemplary electrochemical heat transfer device. A user may only need to connect a hot and cold heat exchanger to the heat exchange ports 72. There may be an inlet and outlet 72, 72' and 72", 72'", respectively, for a hot and cold heat exchange fluid. A user may also connect and hydrogen source to the hydrogen feed port 73. As shown in FIG. 24, two heat exchanger connections are configured on a single end plate, one hot, 72, 72' for the inlet and outlet, and one cold. 72", 72'", for the inlet and outlet. A first heat exchanger connection provides flow of a heat exchanger fluid that carries heat from the electrochemical cell and second heat exchanger connection provides flow of a heat exchanger fluid that carries heat to the electrochemical cell. Cells can be back ported, side ported or ported internally. In addition, the end plate could be designed so that from the users' perspective they only have to connect a plug and the hot and cold lines to protruding fittings; with all controls etc. embedded in the plate.

Figure 26:
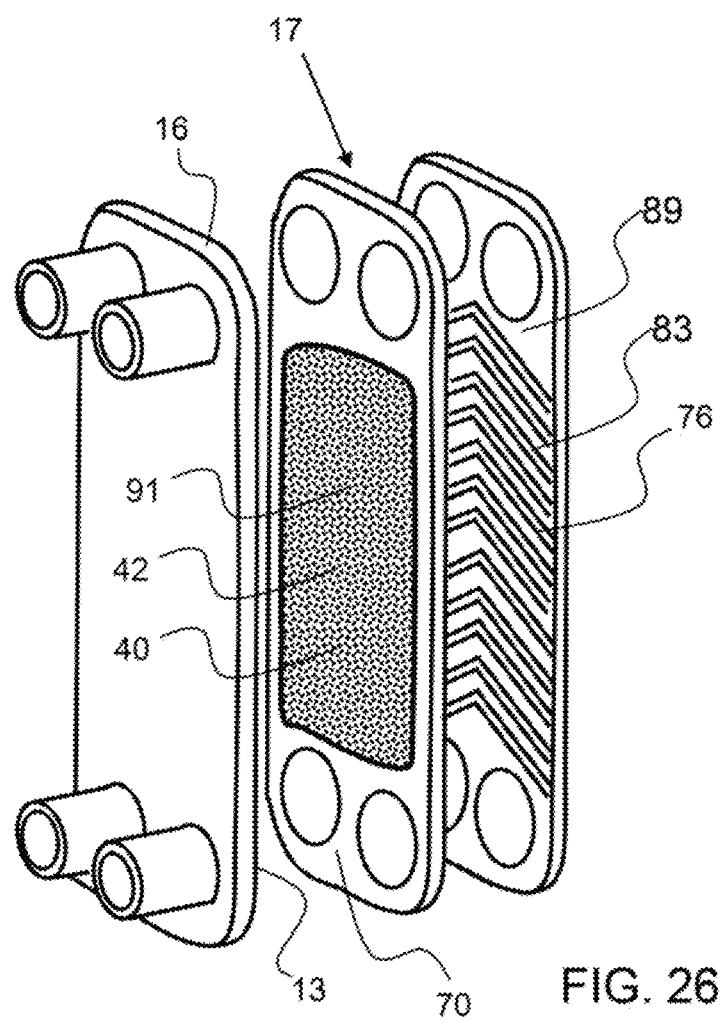
FIG. 26 show an exemplary integrated electrochemical compressor and metal hydride heat exchanger having an integrated heat exchanger conduit and a metal hydride reservoir configured with the electrochemical cell.

As shown in FIG. 26, an exemplary integrated electrochemical compressor and metal hydride heat exchanger 17 has an electrochemical cell 16 with an integrated heat exchanger conduit 76, and a metal hydride reservoir 40 configured with the electrochemical cell 16. The integrated, heat exchanger conduit 76 is configured in the end plate 89 to form a heat exchanger. The conduits are channels formed in the end place and press against the bipolar plate 70 to form a conduit. Heat exchanger conduits may be formed through the end plate or the bi-polar plate as well, such as apertures that extend across or through the end plate or bipolar plate that form conduits that may be less prone to leakage issues. The metal hydride reservoir 40 is a pouch 91 that contains the metal hydride 42 and may be easily replaced. The pouch may be a porous material, such as a porous fluoropolymer.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they carne within the scope of the appended claims and their equivalents.

What is claimed is:

1. An electrochemical heat transfer system comprising an electrochemical heat transfer device comprising: a) a controller; b) a working fluid comprising hydrogen; c) An electrochemical hydrogen compressor comprising: i) an anode; ii) a cathode; iii) a proton exchange membrane; iv) a power supply coupled to the anode and cathode to create an electrical potential across the anode and cathode to transfer the hydrogen across the proton exchange membrane from the anode to the cathode; d) a first reservoir comprising a metal hydride forming alloy; e) a second reservoir comprising a metal hydride forming alloy; f) a first heat transfer device coupled to said first reservoir; g) a second heat exchange device coupled to the said second reservoir; h) a set of conduits to fluidly connecting the electrochemical hydrogen compressor with the first heat transfer device the second heat transfer device; wherein the electrochemical hydrogen compressor transfers hydrogen from said first reservoir to the second reservoir and wherein hydrogen is desorbed from the metal hydride in said first reservoir and wherein hydrogen is absorbed by the metal hydride in said second reservoir; wherein heat is transferred from the first heat exchange device to said first reservoir and wherein heat is transferred from the second reservoir to the second heat exchange device; i) a desiccant unit that is coupled with the set of conduits to receive the working fluid and remove moisture; j) a desiccant bypass valve; wherein when the desiccant bypass valve is open, the working fluid bypasses the desiccant unit, and wherein when the desiccant bypass valve is closed, the working fluid enters into the desiccant unit to remove moisture from the working fluid.

2. The electrochemical heat transfer system of claim 1, wherein the working fluid consists essentially of hydrogen.

3. The electrochemical heat transfer system of claim 1, wherein the proton exchange membrane comprises perfluorosulfonic acid.

4. The electrochemical heat transfer system of claim 1, wherein the proton exchange membrane comprises phosphoric acid-functionalized polybenzimidazole/polytetrafluoroethylene.

5. The electrochemical heat transfer system of claim 1, wherein the proton exchange membrane comprises is a reinforced proton exchange membrane having a support membrane.

6. The electrochemical heat transfer system of claim 5, wherein the support membrane comprises an expanded polytetrafluoroethylene membrane.

7. The electrochemical heat transfer system of claim 1, wherein the proton exchange membrane has a thickness of no more than about 20 μm.

8. The electrochemical heat transfer system of claim 1, wherein the proton exchange membrane comprises a desiccant.

9. The electrochemical heat transfer system of claim 1, wherein at least one of the first or second reservoirs comprise a fluoropolymer to prevent attachment of the metal hydride.

10. The electrochemical heat transfer system of claim 1, wherein at least one of the first or second reservoirs comprise a desiccant.

11. The electrochemical heat transfer system of claim 1, comprising a heat transfer device in thermal communication with at least one of the first or second reservoirs.

12. The electrochemical heat transfer system of claim 11, wherein the heat transfer device comprises a heat exchange conduit and wherein a heat transfer fluid flows through said heat exchange conduit.

13. The electrochemical heat transfer system of claim 1, wherein the metal hydride forming alloy comprises LaNi5.

14. The electrochemical heat transfer system of claim 1, wherein the metal hydride forming alloy LaNi(4.7) Al(0.3).

15. The electrochemical heat transfer system of claim 1, wherein the metal hydride forming alloy further comprises an additive to promote expansion and contraction.

\* \* \* \* \*